(12) United States Patent
Hu et al.

(10) Patent No.: US 12,301,482 B2
(45) Date of Patent: May 13, 2025

(54) RESOURCE INDICATION METHOD, ACCESS POINT, AND STATION

(71) Applicant: HUAWEI TECHNOLOGIES CO., LTD., Guangdong (CN)

(72) Inventors: Mengshi Hu, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/423,260

(22) Filed: Jan. 25, 2024

(65) Prior Publication Data
US 2024/0243860 A1 Jul. 18, 2024

Related U.S. Application Data

(63) Continuation of application No. 17/985,355, filed on Nov. 11, 2022, now Pat. No. 11,979,342, which is a
(Continued)

(30) Foreign Application Priority Data

Jun. 19, 2020 (CN) .......................... 202010569190.4

(51) Int. Cl.
H04L 5/00 (2006.01)
(52) U.S. Cl.
CPC .......... H04L 5/0007 (2013.01); H04L 5/0044 (2013.01)
(58) Field of Classification Search
CPC ... H04L 5/0007; H04L 5/0044; H04L 5/0094; H04W 28/06; H04W 72/0453;
(Continued)

(56) References Cited

U.S. PATENT DOCUMENTS

2016/0066338 A1 3/2016 Kwon et al.
2019/0141570 A1 5/2019 Verma et al.
(Continued)

FOREIGN PATENT DOCUMENTS

CN 105589506 A 5/2016
CN 108135032 A 6/2018
(Continued)

OTHER PUBLICATIONS

Samsung, "SU PPDU SIG Contents Considerations", Mar. 5, 2020. (Year: 2020).*
(Continued)

*Primary Examiner* — Mang Hang Yeung

(57) ABSTRACT

This application relates to the field of wireless fidelity technologies, and in particular, to a resource indication method, an access point, and a station. The method includes: An access point generates a PPDU, and sends the PPDU, where the PPDU comprises a preamble puncturing information field; and where when the PPDU is in non-orthogonal frequency division multiple access (non-OFDMA) transmission mode, the preamble puncturing information field is used to indicate a puncturing status of an entire bandwidth corresponding to the PPDU; when the PPDU is in an orthogonal frequency division multiple access (OFDMA) transmission mode, the preamble puncturing information field is used to indicate a puncturing status of 80 MHz corresponding to a frequency domain fragment.

23 Claims, 8 Drawing Sheets

| | | L-Preamble | RL-SIG | U-SIG 1 | EHT-SIG 1_1 |
|---|---|---|---|---|---|
| Primary 80 MHz channel | | L-Preamble | RL-SIG | U-SIG 1 | EHT-SIG 1_2 |
| | | L-Preamble | RL-SIG | U-SIG 1 | EHT-SIG 1_1 |
| | | L-Preamble | RL-SIG | U-SIG 1 | EHT-SIG 1_2 |
| Second 80 MHz channel | | L-Preamble | RL-SIG | U-SIG 2 | EHT-SIG 2_1 |
| | | L-Preamble | RL-SIG | U-SIG 2 | EHT-SIG 2_2 |
| | | L-Preamble | RL-SIG | U-SIG 2 | EHT-SIG 2_1 |
| | | L-Preamble | RL-SIG | U-SIG 2 | EHT-SIG 2_2 |
| Third 80 MHz channel | | L-Preamble | RL-SIG | U-SIG 3 | EHT-SIG 3_1 |
| | | L-Preamble | RL-SIG | U-SIG 3 | EHT-SIG 3_2 |
| | | L-Preamble | RL-SIG | U-SIG 3 | EHT-SIG 3_1 |
| | | L-Preamble | RL-SIG | U-SIG 3 | EHT-SIG 3_2 |
| Fourth 80 MHz channel | | L-Preamble | RL-SIG | U-SIG 4 | EHT-SIG 4_1 |
| | | L-Preamble | RL-SIG | U-SIG 4 | EHT-SIG 4_2 |
| | | L-Preamble | RL-SIG | U-SIG 4 | EHT-SIG 4_1 |
| | | L-Preamble | RL-SIG | U-SIG 4 | EHT-SIG 4_2 |

Related U.S. Application Data continuation of application No. PCT/CN2021/097971, filed on Jun. 2, 2021.

(58) Field of Classification Search
CPC ... H04W 72/23; H04W 84/12; H04W 28/065; Y02D 30/70
USPC .......................................................... 370/329
See application file for complete search history.

(56) References Cited

U.S. PATENT DOCUMENTS

| | | |
|---|---|---|
| 2019/0215037 A1 | 7/2019 | Seok et al. |
| 2019/0238301 A1 | 8/2019 | Verma et al. |
| 2019/0288895 A1 | 9/2019 | Chen et al. |
| 2020/0076552 A1 | 3/2020 | Cherian et al. |
| 2020/0177425 A1 | 6/2020 | Chen et al. |
| 2021/0045117 A1* | 2/2021 | Chen .................. H04L 5/0091 |
| 2021/0045151 A1* | 2/2021 | Chen .................. H04W 72/23 |
| 2021/0212035 A1 | 7/2021 | Son et al. |
| 2021/0314922 A1* | 10/2021 | Lim .................. H04L 5/0044 |

FOREIGN PATENT DOCUMENTS

| | | |
|---|---|---|
| CN | 110730050 A | 1/2020 |
| CN | 111279647 A | 6/2020 |
| CN | 111295858 A | 6/2020 |
| EP | 4089969 A1 | 11/2022 |
| JP | 2023508405 A | 3/2023 |
| RU | 2696249 C1 | 8/2019 |
| WO | 2019149243 A1 | 8/2019 |
| WO | 2020040622 A1 | 2/2020 |
| WO | 2021141437 A1 | 7/2021 |

OTHER PUBLICATIONS

Huawei, HiSilicon etal, "Inband leakage and blocking of wideband operation in NR-U", 3GPP TSG RAN WG1 Meeting #95,Spokane, USA, Nov. 12-Nov. 16, 2018,R1-1812674,total:6pages.

IEEE 802.11-20/0285r1, Wook Bong Lee et al, SU PPDU SIG Contents Considerations, Mar. 2020, 22 pages.

R1-1912197, Intel Corporation, Channel access mechanism for NR-unlicensed, 3GPP TSG RAN WG1 Meeting #99, Reno, USA, Nov. 18 22, 2019, 30 pages.

Ross Jian Yu (Huawei): EHT-SIGCompression Format IEEE Draft; 11-20-0783-O1-OOBE-EHT-SIG-Compression-Format IEEE-SA Mentor, Piscataway, NJ USAIvol.802.11211 May 2020 XP068168014EHT; 802 .11be, No. 1(May 21, 2020) pp. 1-16.

IEEE 802.11-20/0606r2, Wook Bong Lee et al., Further Discussion on Bandwidth and Puncturing Information, Apr. 2020, 19 pages.

IEEE 802.11-20/0380r0, Sameer Vermani et al, U-SIG Structure and Preamble Processing, Mar. 2020, 10 pages.

IEEE 802.11-20/0285r5, Wook Bong Lee et al, SU PPDU SIG Contents Considerations, Mar. 2020, 24 pages.

IEEE 802.11-20/0524r2, Dongguk Lim et al, Signaling of preamble puncturing in SU transmission, Mar. 2020, 18 pages.

IEEE 802.11-20/0606r0, Wook Bong Lee et al, Further Discussion on Bandwidth and Puncturing Information, Apr. 2020, 10 pages.

IEEE Std 802.11-2016, IEEE Standard for Information technology-Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

\* cited by examiner

| | L-Preamble | RL-SIG | U-SIG 1 | EHT-SIG 1_1 |
|---|---|---|---|---|
| Primary 80 MHz channel | L-Preamble | RL-SIG | U-SIG 1 | EHT-SIG 1_2 |
| | L-Preamble | RL-SIG | U-SIG 1 | EHT-SIG 1_1 |
| | L-Preamble | RL-SIG | U-SIG 1 | EHT-SIG 1_2 |
| Second 80 MHz channel | L-Preamble | RL-SIG | U-SIG 2 | EHT-SIG 2_1 |
| | L-Preamble | RL-SIG | U-SIG 2 | EHT-SIG 2_2 |
| | L-Preamble | RL-SIG | U-SIG 2 | EHT-SIG 2_1 |
| | L-Preamble | RL-SIG | U-SIG 2 | EHT-SIG 2_2 |
| Third 80 MHz channel | L-Preamble | RL-SIG | U-SIG 3 | EHT-SIG 3_1 |
| | L-Preamble | RL-SIG | U-SIG 3 | EHT-SIG 3_2 |
| | L-Preamble | RL-SIG | U-SIG 3 | EHT-SIG 3_1 |
| | L-Preamble | RL-SIG | U-SIG 3 | EHT-SIG 3_2 |
| Fourth 80 MHz channel | L-Preamble | RL-SIG | U-SIG 4 | EHT-SIG 4_1 |
| | L-Preamble | RL-SIG | U-SIG 4 | EHT-SIG 4_2 |
| | L-Preamble | RL-SIG | U-SIG 4 | EHT-SIG 4_1 |
| | L-Preamble | RL-SIG | U-SIG 4 | EHT-SIG 4_2 |

FIG. 6

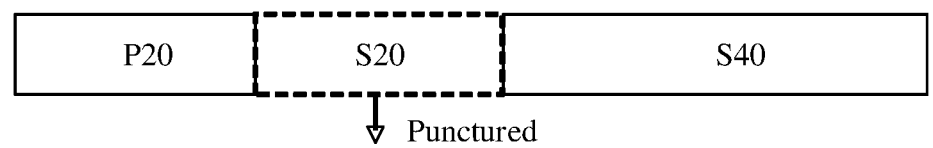
(a)
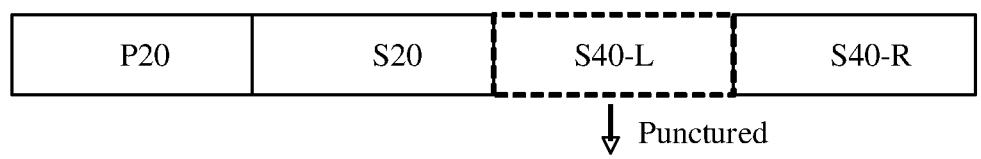
(b)
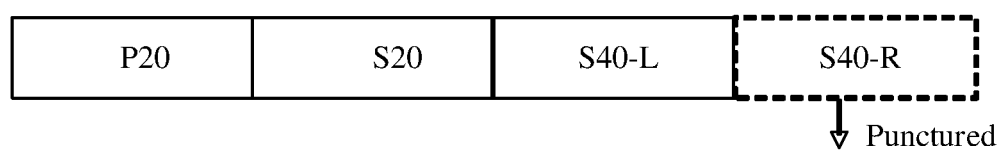
(c)
FIG. 7

RESOURCE INDICATION METHOD, ACCESS POINT, AND STATION

CROSS-REFERENCE TO RELATED APPLICATIONS

This application is a continuation of U.S. patent application Ser. No. 17/985,355, filed on Nov. 11, 2022, which is a continuation of International Application No. PCT/CN2021/097971, filed on Jun. 2, 2021, which claims priority to Chinese Patent Application No. 202010569190.4, filed on Jun. 19, 2020. All of the afore-mentioned patent applications are hereby incorporated by reference in their entireties.

TECHNICAL FIELD

This application relates to the field of wireless fidelity technologies, and in particular, to a resource indication method, an access point, and a station.

BACKGROUND

To support orthogonal frequency division multiple access (OFDMA) transmission, in 802.11ax, a frequency band resource is divided into several resource units, and only allocation of one resource unit to one station or a plurality of users is supported. However, in the future, allocation of a plurality of resource units to one station or a plurality of stations may be supported. If a manner of indicating an allocated resource to a user by using a resource unit subfield in 802.11ax is still used, signaling overheads become higher as a bandwidth increases.

To reduce signaling overheads, it is proposed that a segment structure of an extremely high throughput physical layer protocol data unit (EHT PPDU) may indicate an allocated resource to a user. However, how to indicate an allocated resource to a user by using a segment structure of an EHT PPDU is a problem that urgently needs to be resolved.

SUMMARY

This application provides a resource indication method, an access point, and a station. A segment structure of an EHT PPDU may indicate that a full bandwidth is allocated to a scheduled STA in a frequency domain segment, so that signaling overheads can be further reduced.

According to a first aspect, a resource indication method is provided. The method may be performed by a first apparatus. The first apparatus may be a communication device, or may be a communication apparatus, for example, a chip system, that can support the communication device in implementing a function required in the method. For example, the communication device is an access point. The method includes:

The access point generates a physical layer protocol data unit PPDU, and sends the PPDU, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment. In this embodiment of this application, the first bandwidth is the channel bandwidth for transmitting the PPDU, or may be considered as a full bandwidth. The preamble puncturing indication information may indicate that a full bandwidth, namely, a full-bandwidth (non-punctured) resource is allocated to a scheduled STA in a frequency domain segment. There is no need to separately indicate each frequency domain segment obtained through full-bandwidth division, so that overheads of a field used to carry the preamble puncturing indication information can be reduced. A station may determine an allocated resource by using the preamble puncturing indication information and a full bandwidth size indicated by a bandwidth field, and does not need to read resource indications of all the frequency domain segments, so that power consumption of the station can be reduced.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified. In this solution, the preamble puncturing indication information may be reused to indicate the compression mode. It should be understood that some fields in the PPDU in the compression mode are omitted or deleted, or lengths of some fields are reduced, for example, the resource unit allocation subfield or the user field is omitted or deleted. In this way, the PPDU sent by the access point may carry a small quantity of resource unit allocation subfields, even does not carry any resource unit allocation subfield, or the like. Therefore, signaling overheads can be further reduced. If the compression mode of the PPDU is determined based on the preamble puncturing indication information, the station may not need to continue to read, for example, the user field or the resource unit allocation subfield that follows a U-SIG field, so that the power consumption of the station can be reduced.

In a possible implementation, the preamble puncturing indication information is carried in a first preamble puncturing information field, and the first preamble puncturing information field is located in the universal field U-SIG field.

According to a second aspect, a resource indication method is provided. The method may be performed by a second apparatus. The second apparatus may be a communication device, or may be a communication apparatus, for example, a chip system, that can support the communication device in implementing a function required in the method. For example, the communication device is a station. The method includes:

The station receives a PPDU from an access point, where the PPDU includes preamble puncturing indication information transmitted in a first frequency domain segment, the preamble puncturing indication information indicates that a first bandwidth is allocated to a scheduled user in the first frequency domain segment, so that the station determines an allocated resource based on the preamble puncturing indication information, where the first bandwidth is a channel bandwidth for transmitting the PPDU, and the first bandwidth includes the first frequency domain segment.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

For beneficial technical effects of the second aspect or the implementations of the second aspect, refer to the beneficial technical effects of the first aspect or the implementations of the first aspect. Details are not described herein again.

According to a third aspect, a resource indication method is provided. The method may be performed by a first apparatus. The first apparatus may be a communication device, or may be a communication apparatus, for example, a chip system, that can support the communication device in implementing a function required in the method. For example, the communication device is an access point. The method includes:

The access point generates a PPDU, and sends the PPDU, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment. In this embodiment of this application, the preamble puncturing indication information indicates that no resource unit is allocated to the user in the first frequency domain segment. That no resource unit is allocated herein means that no resource unit in the first frequency domain segment is allocated to the user in the first frequency domain segment, and no resource unit in the entire channel bandwidth for transmitting the PPDU is allocated to the user in the first frequency domain segment. If no resource is allocated to a station in a frequency domain segment, the station does not need to read, for example, a subsequent EHT-SIG field in the PPDU, so that energy consumption can be reduced.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

For technical effects of the implementations of the third aspect, refer to the beneficial technical effects of the implementations of the first aspect. Details are not described herein again.

According to a fourth aspect, a resource indication method is provided. The method may be performed by a second apparatus. The second apparatus may be a communication device, or may be a communication apparatus, for example, a chip system, that can support the communication device in implementing a function required in the method. For example, the communication device is a station. The method includes:

The station receives a PPDU from an access point, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment; and then the station determines an allocated resource based on the preamble puncturing indication information.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

For technical effects of the fourth aspect or the implementations of the fourth aspect, refer to the beneficial technical effects of the third aspect or the implementations of the third aspect. Details are not described herein again.

According to a fifth aspect, a resource indication method is provided. The method may be performed by a second apparatus. The second apparatus may be a communication device, or may be a communication apparatus, for example, a chip system, that can support the communication device in implementing a function required in the method. For example, the communication device is a station. The method includes:

An access point generates a PPDU, and sends the PPDU, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment. In this embodiment of this application, for a full bandwidth of 80 MHz, a preamble puncturing information field that carries the preamble puncturing indication information may indicate all puncturing statuses supported in non-OFDMA transmission, and may further indicate a puncturing status of an 80 MHz channel corresponding to each frequency domain segment in OFDMA transmission. In this way, the station may determine an allocated resource based on the preamble puncturing indication information and a bandwidth field. For example, if the bandwidth field indicates that the PPDU is in the non-OFDMA transmission mode, the preamble puncturing indication information indicates the puncturing status of the frequency domain segment corresponding to the 80 MHz channel in non-OFDMA transmission. If the bandwidth field indicates that the PPDU is in the OFDMA transmission mode, the preamble puncturing indication information indicates the punctured or non-punctured full bandwidth configuration of the 80 MHz channel in the OFDMA transmission mode. In this case, when the full bandwidth is greater than or equal to 160 MHz, the station only needs to read the puncturing status of the 80 MHz channel, and does not need to read bandwidth information other than the 80 MHz channel. Therefore, this solution is actually compatible with a puncturing status indicated in 80 MHz OFDMA transmission based on a puncturing status indicated in non-OFDMA transmission.

According to a sixth aspect, a resource indication method is provided. The method may be performed by a second apparatus. The second apparatus may be a communication device, or may be a communication apparatus, for example, a chip system, that can support the communication device in implementing a function required in the method. For example, the communication device is a station. The method includes:

The station receives a PPDU from an access point, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment; and then the station determines an allocated resource based on the preamble puncturing indication information and a bandwidth field.

For technical effects of the sixth aspect, refer to the beneficial technical effects of the fifth aspect. Details are not described herein again.

According to a seventh aspect, a resource indication method is provided. The method may be performed by a second apparatus. The second apparatus may be a communication device, or may be a communication apparatus, for example, a chip system, that can support the communication device in implementing a function required in the method. For example, the communication device is a station. The method includes:

An access point generates a PPDU, and sends the PPDU, where the PPDU includes preamble puncturing indication information transmitted in a first frequency domain segment, the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, the second preamble puncturing information field indicates a puncturing status of a remaining frequency domain segment in a first bandwidth other than the first frequency domain segment, the first bandwidth is a channel bandwidth for transmitting the PPDU, and the first bandwidth includes the first frequency domain segment. In this embodiment of this application, a puncturing status of a bandwidth greater than 80 MHz, for example, a puncturing status of a 160 MHz bandwidth, a 240 MHz bandwidth, or a 320 MHz bandwidth is indicated by using two preamble puncturing information fields. For example, the first preamble puncturing information field indicates a puncturing status of a frequency domain segment corresponding to an 80 MHz channel, and the second preamble puncturing information field indicates a puncturing status of a remaining frequency band in the full bandwidth other than the frequency domain segment. The station may determine an allocated resource by using the first preamble puncturing information field and the second preamble puncturing information field. It should be understood that, because there can be only one puncture in the full bandwidth, the second preamble puncturing information field has a plurality of reserved statuses (or entries) for other purposes, so that there is more extensible indication content.

According to an eighth aspect, a resource indication method is provided. The method may be performed by a second apparatus. The second apparatus may be a communication device, or may be a communication apparatus, for example, a chip system, that can support the communication device in implementing a function required in the method. For example, the communication device is a station. The method includes:

The station receives a PPDU from an access point, where the PPDU includes preamble puncturing indication information transmitted in a first frequency domain segment, and the station determines an allocated resource based on the preamble puncturing indication information, where the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, the second preamble puncturing information field indicates a puncturing status of a remaining frequency domain segment in a first bandwidth other than the first frequency domain segment, the first bandwidth is a channel bandwidth for transmitting the PPDU, and the first bandwidth includes the first frequency domain segment.

For technical effects of the eighth aspect, refer to the beneficial technical effects of the seventh aspect. Details are not described herein again.

According to a ninth aspect, a communication apparatus is provided. For example, the communication apparatus is the foregoing access point or an apparatus disposed in the access point. In some embodiments, the communication apparatus may be configured to perform the method in any one of the first aspect or the possible implementations of the first aspect; the communication apparatus may be configured to perform the method in any one of the third aspect or the possible implementations of the third aspect; the communication apparatus may be configured to perform the method in any one of the fifth aspect or the possible implementations of the fifth aspect; or the communication apparatus may be configured to perform the method in any one of the seventh aspect or the possible implementations of the seventh aspect. Specifically, the communication apparatus may include a module configured to perform the method in any one of the first aspect or the possible implementations of the first aspect, include a module configured to perform the method in any one of the third aspect or the possible implementations of the third aspect, include a module configured to perform the method in any one of the fifth aspect or the possible implementations of the fifth aspect, or include a module configured to perform the method in any one of the seventh aspect or the possible implementations of the seventh aspect, for example, include a processing module and a transceiver module that are coupled to each other. For example, the communication apparatus is the foregoing access point.

In some embodiments, the processing module is configured to generate a PPDU, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment; and the transceiver module is configured to send the PPDU.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the processing module is configured to generate a PPDU, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment; and the transceiver module is configured to send the PPDU.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the processing module is configured to generate a PPDU, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment; and the transceiver module is configured to send the PPDU.

In some other embodiments, the processing module is configured to generate a PPDU, where the PPDU includes preamble puncturing indication information transmitted in a first frequency domain segment, the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, the second preamble puncturing information field indicates a puncturing status of a remaining frequency domain segment in a first bandwidth other than the first frequency domain segment, the first bandwidth is a channel bandwidth for transmitting the PPDU, and the first bandwidth includes the first frequency domain segment; and the transceiver module is configured to send the PPDU.

According to a tenth aspect, a communication apparatus is provided. For example, the communication apparatus is the foregoing station or an apparatus disposed in the station. In some embodiments, the communication apparatus is configured to perform the method in any one of the second aspect or the possible implementations of the second aspect; the communication apparatus is configured to perform the method in any one of the fourth aspect or the possible implementations of the fourth aspect; the communication apparatus is configured to perform the method in any one of the sixth aspect or the possible implementations of the sixth aspect; or the communication apparatus is configured to perform the method in any one of the eighth aspect or the possible implementations of the eighth aspect. Specifically, the communication apparatus may include a module configured to perform the method in any one of the second aspect or the possible implementations of the second aspect, include a module configured to perform the method in any one of the fourth aspect or the possible implementations of the fourth aspect, include a module configured to perform the method in any one of the sixth aspect or the possible implementations of the sixth aspect, or include a module configured to perform the method in any one of the eighth aspect or the possible implementations of the eighth aspect, for example, include a processing module and a transceiver module that are coupled to each other. For example, the communication apparatus is the foregoing station.

In some embodiments, the transceiver module is configured to receive a PPDU from an access point, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment; and the processing module is configured to determine an allocated resource based on the preamble puncturing indication information.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the transceiver module is configured to receive a PPDU from an access point, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment; and the processing module is configured to determine an allocated resource based on the preamble puncturing indication information.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the transceiver module is configured to receive a PPDU from an access point, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment; and the processing module is configured to determine an allocated resource based on the preamble puncturing indication information and a bandwidth field.

In some other embodiments, the transceiver module is configured to receive a PPDU from an access point, where the PPDU includes preamble puncturing indication information transmitted in a first frequency domain segment, the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, the second preamble puncturing information field indicates a puncturing status of a remaining frequency domain segment in a first bandwidth other than the first frequency domain segment, the first bandwidth is a channel bandwidth for transmitting the PPDU, and the first bandwidth includes the first frequency domain segment; and the processing module is configured to determine an allocated resource based on the preamble puncturing indication information.

According to an eleventh aspect, still another communication apparatus is provided. The communication apparatus is, for example, the foregoing access point or is disposed at the access point. For example, the communication apparatus is a chip disposed in the access point. The communication apparatus includes a processor and a transceiver, to implement the method described in the first aspect, the third aspect, the fifth aspect, the seventh aspect, the possible implementations of the first aspect, the possible implementations of the third aspect, the possible implementations of the fifth aspect, or the possible implementations of the seventh aspect. The transceiver is implemented by using, for example, an antenna, a feeder, or a codec in the access point. Alternatively, if the communication apparatus is the chip disposed in the access point, the transceiver is, for example, a communication interface in the chip. The communication interface is connected to a radio frequency transceiver component in the access point, to implement information sending and receiving through the radio frequency transceiver component.

In some embodiments, the processor is configured to generate a PPDU, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment; and the transceiver is configured to send the PPDU.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the processor is configured to generate a PPDU, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment; and the transceiver is configured to send the PPDU.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the processor is configured to generate a PPDU, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment; and the transceiver is configured to send the PPDU.

In some other embodiments, the processor is configured to generate a PPDU, where the PPDU includes preamble puncturing indication information transmitted in a first frequency domain segment, the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, the second preamble puncturing information field indicates a puncturing status of a remaining frequency domain segment in a first bandwidth other than the first frequency domain segment, the first bandwidth is a channel bandwidth for transmitting the PPDU, and the first bandwidth includes the first frequency domain segment; and the transceiver is configured to send the PPDU.

According to a twelfth aspect, still another communication apparatus is provided. The communication apparatus is, for example, the foregoing station or is disposed at the station. For example, the communication apparatus is a chip disposed in the access point. The communication apparatus includes a processor and a transceiver, to implement the method described in the second aspect, the fourth aspect, the sixth aspect, the eighth aspect, the possible implementations of the second aspect, the possible implementations of the fourth aspect, the possible implementations of the sixth aspect, or the possible implementations of the eighth aspect. The transceiver is implemented by using, for example, an antenna, a feeder, or a codec in the station. Alternatively, if the communication apparatus is the chip disposed in the station, the transceiver is, for example, a communication interface in the chip. The communication interface is connected to a radio frequency transceiver component in the station, to implement information sending and receiving through the radio frequency transceiver component.

In some embodiments, the transceiver is configured to receive a PPDU from an access point, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment; and the processor is configured to determine an allocated resource based on the preamble puncturing indication information.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the transceiver is configured to receive a PPDU from an access point, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment; and the processor is configured to determine an allocated resource based on the preamble puncturing indication information.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a universal field U-SIG field.

In some other embodiments, the transceiver is configured to receive a PPDU from an access point, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment, the first bandwidth is a channel bandwidth for transmitting the PPDU, and the first bandwidth includes the first frequency domain segment; and
the processor is configured to determine an allocated resource based on the preamble puncturing indication information and a bandwidth field.

In some other embodiments, the transceiver is configured to receive a PPDU from an access point, where the PPDU includes preamble puncturing indication information transmitted in a first frequency domain segment, the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, and the second preamble puncturing information field indicates a puncturing status of a remaining frequency domain segment in a first bandwidth other than the first frequency domain segment; and
the processor is configured to determine an allocated resource based on the preamble puncturing indication information.

According to a thirteenth aspect, still another communication apparatus is provided. The communication apparatus may be the access point in the foregoing method design. For example, the communication apparatus is a chip disposed in the access point. The communication apparatus includes a memory configured to store computer-executable program code, and a processor coupled to the memory. The program code stored in the memory includes instructions. When the processor executes the instructions, the communication apparatus is enabled to perform the method in any one of the first aspect, the third aspect, the fifth aspect, the seventh aspect, the possible implementations of the first aspect, the possible implementations of the third aspect, the possible implementations of the fifth aspect, or the possible implementations of the seventh aspect.

In some embodiments, the communication apparatus may further include a communication interface. The communication interface may be a transceiver in the access point, for example, is implemented by using an antenna, a feeder, or a codec in the access point. Alternatively, if the communication apparatus is the chip disposed in the access point, the communication interface may be an input/output interface, for example, an input/output pin, of the chip.

According to a fourteenth aspect, still another communication apparatus is provided. The communication apparatus may be the station in the foregoing method design. For example, the communication apparatus is a chip disposed in the station. The communication apparatus includes a memory configured to store computer-executable program code, and a processor coupled to the memory. The program code stored in the memory includes instructions. When the processor executes the instructions, the communication apparatus is enabled to perform the method in any one of the second aspect, the fourth aspect, the sixth aspect, the eighth aspect, the possible implementations of the second aspect, the possible implementations of the fourth aspect, the possible implementations of the sixth aspect, or the possible implementations of the eighth aspect.

In some embodiments, the communication apparatus may further include a communication interface. The communication interface may be a transceiver in the station, for example, is implemented by using an antenna, a feeder, or a codec in the station. Alternatively, if the communication apparatus is the chip disposed in the station, the communication interface may be an input/output interface, for example, an input/output pin, of the chip.

According to a fifteenth aspect, a communication system is provided. The communication system may include the communication apparatus described in the ninth aspect, the communication apparatus described in the eleventh aspect, or the communication apparatus described in the thirteenth aspect, and include the communication apparatus described in the tenth aspect, the communication apparatus described in the twelfth aspect, or the communication apparatus described in the fourteenth aspect. It should be understood that the communication system may include more access points and/or stations.

According to a sixteenth aspect, an embodiment of this application provides a chip system. The chip system includes a processor, and may further include a memory, to implement the method performed by the access point in the first aspect or the station in the second aspect, the access point in the third aspect or the station in the fourth aspect, the access point in the fifth aspect or the station in the sixth aspect, or the access point in the seventh aspect or the station in the eighth aspect. The chip system may include a chip, or may include the chip and another discrete component.

According to a seventeenth aspect, an embodiment of this application further provides a computer-readable storage medium, including instructions. When the instructions are run on a computer, the computer is enabled to perform the method performed by the access point in the first aspect or the station in the second aspect, the access point in the third aspect or the station in the fourth aspect, the access point in the fifth aspect or the station in the sixth aspect, or the access point in the seventh aspect or the station in the eighth aspect; or the computer is enabled to implement a function implemented by the access point in the first aspect or the station in the second aspect, the access point in the third aspect or the station in the fourth aspect, the access point in the fifth aspect or the station in the sixth aspect, or the access point in the seventh aspect or the station in the eighth aspect.

According to an eighteenth aspect, an embodiment of this application further provides a computer program product. The computer program product stores instructions. When the instructions are run on a computer, the computer is enabled to perform the method performed by the access point in the first aspect or the station in the second aspect, the access point in the third aspect or the station in the fourth aspect, or the access point in the fifth aspect or the station in the sixth aspect, or the access point in the seventh aspect or the station in the eighth aspect; or the computer is enabled to implement a function implemented by the access point in the first aspect or the station in the second aspect, the access point in the third aspect or the station in the fourth aspect, the access point in the fifth aspect or the station in the sixth aspect, or the access point in the seventh aspect or the station in the eighth aspect.

For beneficial effects of the third aspect to the eighteenth aspect and the implementations thereof, refer to the descriptions of the beneficial effects of the first aspect to the eighth aspect and the implementations thereof.

BRIEF DESCRIPTION OF DRAWINGS

FIG. 6 is a schematic diagram of a segment structure of an EHT PPDU according to an embodiment of this application;

FIG. 7 is a schematic puncturing diagram of an 80 MHz frequency domain segment according to an embodiment of this application;

DESCRIPTION OF EMBODIMENTS

To make the objectives, technical solutions, and advantages of embodiments of this application clearer, the following further describes embodiments of this application in detail with reference to the accompanying drawings.

Embodiments of this application are applicable to a wireless local area network (WLAN) scenario, and are applicable to the IEEE 802.11 system standard, for example, the 802.11a/b/g standard, the 802.11n standard, the 802.11ac standard, the 802.11ax standard, or a next generation of the 802.11ax standard, for example, the 802.11be standard, or a next generation standard of the next generation of the 802.11ax standard. Alternatively, embodiments of this application are applicable to a wireless local area network system, for example, an internet of things (IoT) network or a vehicle to everything (V2X) network. Certainly, embodiments of this application may alternatively be applicable to other possible communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, or a future 5G communication system.

Figure 1:
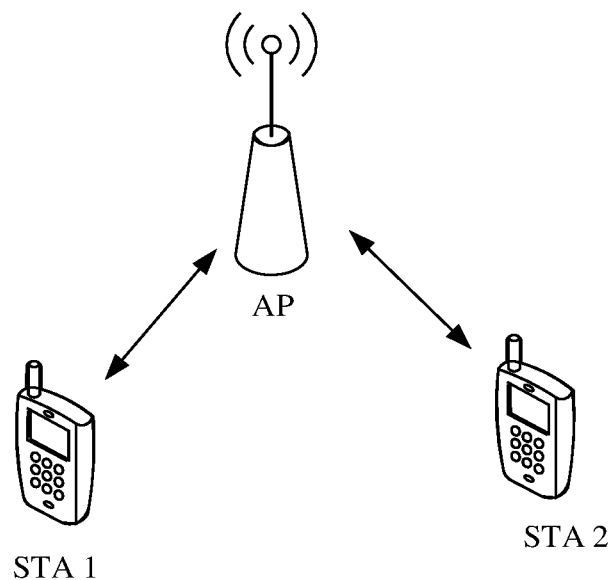
FIG. 1 is a network architecture of a wireless local area network to which an embodiment of this application is applicable.

For example, FIG. 1 is a diagram of a network architecture of a WLAN to which an embodiment of this application is applicable. In FIG. 1, an example in which the WLAN includes one access point (AP) and two stations (STA) associated with the AP is used, where the two STAs are a STA 1 and a STA 2. The AP may schedule a radio resource for the STA 1 and the STA 2, and transmit data on the scheduled radio resource for the STA 1 and the STA 2, where the data includes uplink data information and/or downlink data information. It should be understood that a quantity of APs and a quantity of STAs in FIG. 1 are merely examples, and there may be more or fewer APs and STAs. The AP may communicate with the STA 1 or the STA 2, or the AP may communicate with the STA 1 and the STA 2. It should be understood that, if the WLAN includes a plurality of APs and a plurality of STAs, embodiments of this application are also applicable to communication between the APs. For example, the APs may communicate with each other by using a distributed system (DS), and any AP may schedule a radio resource for a STA associated and/or not associated with the AP, and transmits data on the scheduled radio resource for the STA. Embodiments of this application are further applicable to communication between the STAs.

The STA in embodiments of this application may be any type of user terminal, user apparatus, access apparatus, subscriber station, subscriber unit, mobile station, user agent, or user equipment that has a wireless communication function, or has another name. The user terminal may include various handheld devices, vehicle-mounted devices, wearable devices, or computing devices that have a wireless communication function, or various other processing devices connected to a wireless modem, and various forms of user equipments (UE), mobile stations (MS), terminals, terminal devices, portable communication devices, handheld devices, portable computing devices, entertainment devices, game devices or systems, or global positioning system devices, any other suitable device that is configured to perform network communication through a wireless medium, or the like. For example, the STA may be a router, a switch, or a bridge. Herein, for ease of description, the devices mentioned above are collectively referred to as stations or STAs.

The access point AP in embodiments of this application is an apparatus that is deployed in a wireless communication network to provide a wireless communication function for a STA associated with the AP. The access point AP may be used as a hub of the communication system, and may be a communication device such as a base station, a router, a gateway, a repeater, a communication server, a switch, or a bridge. The base station may include various forms of macro base stations, micro base stations, relay stations, and the like. Herein, for ease of description, the devices mentioned above are collectively referred to as APs.

Figure 2:
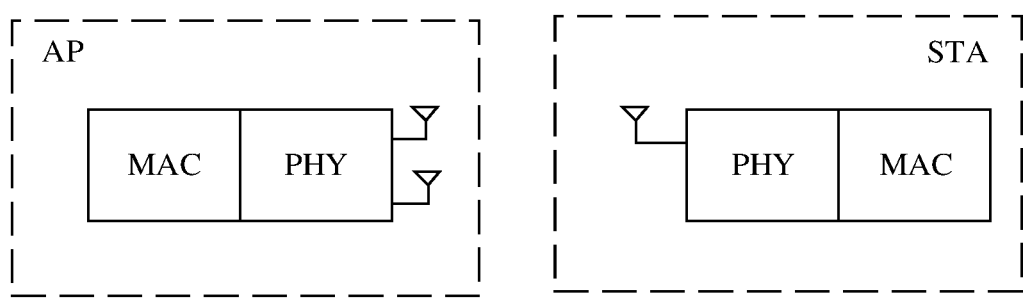
FIG. 2 is a diagram of internal structures of an access point and a station according to an embodiment of this application.

For example, the AP and the STA in this application may be an AP and a STA that are applicable to the 802.11 system standard. FIG. 2 is a diagram of internal structures of an AP and a STA according to an embodiment of this application. The 802.11 system standard focuses on 802.11 physical layer (PHY) and media access control (MAC) parts thereof. Therefore, the STA provided in this embodiment of this application is usually a terminal product that supports the MAC and PHY parts in the 802.11 system standard, for example, a mobile phone or a notebook computer. It should be noted that although only FIG. 2 shows the diagram of the structures of the AP having a plurality of antennas and the STA having a single antenna, in an actual scenario, each of the AP and the STA may have a plurality of antennas, and may be a device having more than two antennas. Each of the AP and the STA includes a PHY baseband module, a MAC layer module, a logical link control (LLC) layer module, and a radio frequency module (an antenna) that belong to a bottom layer, and an internet protocol (IP) processing module, a transmission control protocol (TCP)/user datagram protocol (UDP) processing module, and an application layer module that belong to an upper layer. The bottom layer and the upper layer transmit information through an upper layer interface.

The AP communicates with the STA. The AP may allocate a resource to the STA, and the STA transmits data on the allocated resource. For example, in a Wi-Fi protocol before 802.11ax, for example, 802.11ac, continuous bandwidths, including four types of bandwidths: 20 MHz, 40 MHz, 80 MHz, and 160 MHz, need to be occupied during transmission. One 20 MHz channel is denoted as a primary 20 MHz channel. If a 20 MHz channel in a bandwidth is occupied by transmission of another station, a transmission data bandwidth needs to be reduced. For example, in a continuous 80 MHz bandwidth, the first 20 MHz channel is a primary 20 MHz channel, but the second 20 MHz channel is busy. In this case, based on a continuous bandwidth requirement, only data of the primary 20 MHz channel can be transmitted, in other words, an idle 40 MHz channel in the 80 MHz bandwidth is wasted.

To aggregate more channels to form a larger available bandwidth, the 802.11ax protocol provides a preamble puncturing transmission manner, to allow aggregation of discontinuous channels. In the foregoing example, the AP is allowed to allocate a bandwidth of 20 MHz+40 MHz, so that an idle channel is more effectively used. Specifically, four types of transmission bandwidths are specified in the 802.11ax standard, and the four types of transmission bandwidths are respectively 20 MHz, 40 MHz, 80 MHz, and 160 MHz. A preamble puncturing transmission manner may exist only for the 80 MHz bandwidth and the 160 MHz bandwidth. For example, a 20 MHz channel of the 160 MHz bandwidth may be punctured to form a 140 MHz channel.

The AP communicates with the STA. The AP may allocate a resource to the STA, and the STA transmits data on the allocated resource. For example, before the 802.11ax standard, the AP and the STA may communicate with each other by using an orthogonal frequency division multiplexing (OFDM) technology. An entire bandwidth may be allocated to one STA or a group of STAs for single user (SU) transmission or multi-user multiple-input multiple-output (MU MIMO) transmission. In the 802.11ax standard, an orthogonal frequency division multiple access (OFDMA) technology is introduced, in other words, the AP and the STA may communicate with each other by using the OFDMA technology.

In the OFDMA and MU-MIMO technologies, according to the WLAN protocol, a spectrum bandwidth is divided into several resource units (RU). For example, bandwidth configurations supported by the 802.11ax protocol include 20 MHz, 40 MHz, 80 MHz, 160 MHz, and 80+80 MHz bandwidths. A difference between the 160 MHz bandwidth and the 80+80 MHz bandwidth lies in that the former is a continuous frequency band, and two 80 MHz channels of the latter may be separated, in other words, a 160 MHz bandwidth formed by the two 80 MHz channels is discontinuous. It is stipulated in the 802.11ax protocol that spectrum bandwidths of 20 MHz, 40 MHz, 80 MHz, and 160 MHz may be classified into a plurality of types of RUs, including a 26-subcarrier RU, a 52-subcarrier RU, a 106-subcarrier RU, a 242-subcarrier RU (the maximum RU in the 20 MHz bandwidth), a 484-subcarrier RU (the maximum RU in the 40 MHz bandwidth), a 996-subcarrier RU (the maximum RU in the 80 MHz bandwidth), and a 2*996-subcarrier RU (the maximum RU in the 160 MHz bandwidth). Each RU includes consecutive subcarriers. For example, the 26-subcarrier RU includes 26 consecutive subcarrier RUs. In the following descriptions, a 26-subcarrier RU is denoted as a 26-tone RU, a 52-subcarrier RU is denoted as a 52-tone RU, and so on. The rest can be deduced by analogy.

An AP allocates a resource to a STA on a per RU basis, and may notify, by using a physical layer protocol data unit (PPDU), the STA of the resource allocated to the STA. Specifically, the AP may indicate the allocated RU to the STA by including resource allocation information in a signal field (SIG) included in the PPDU. For example, the signal field may be a high efficient signal field-B (HE-SIG-B), or may be an extremely high throughput signal field (EHT-SIG).

Figure 3:
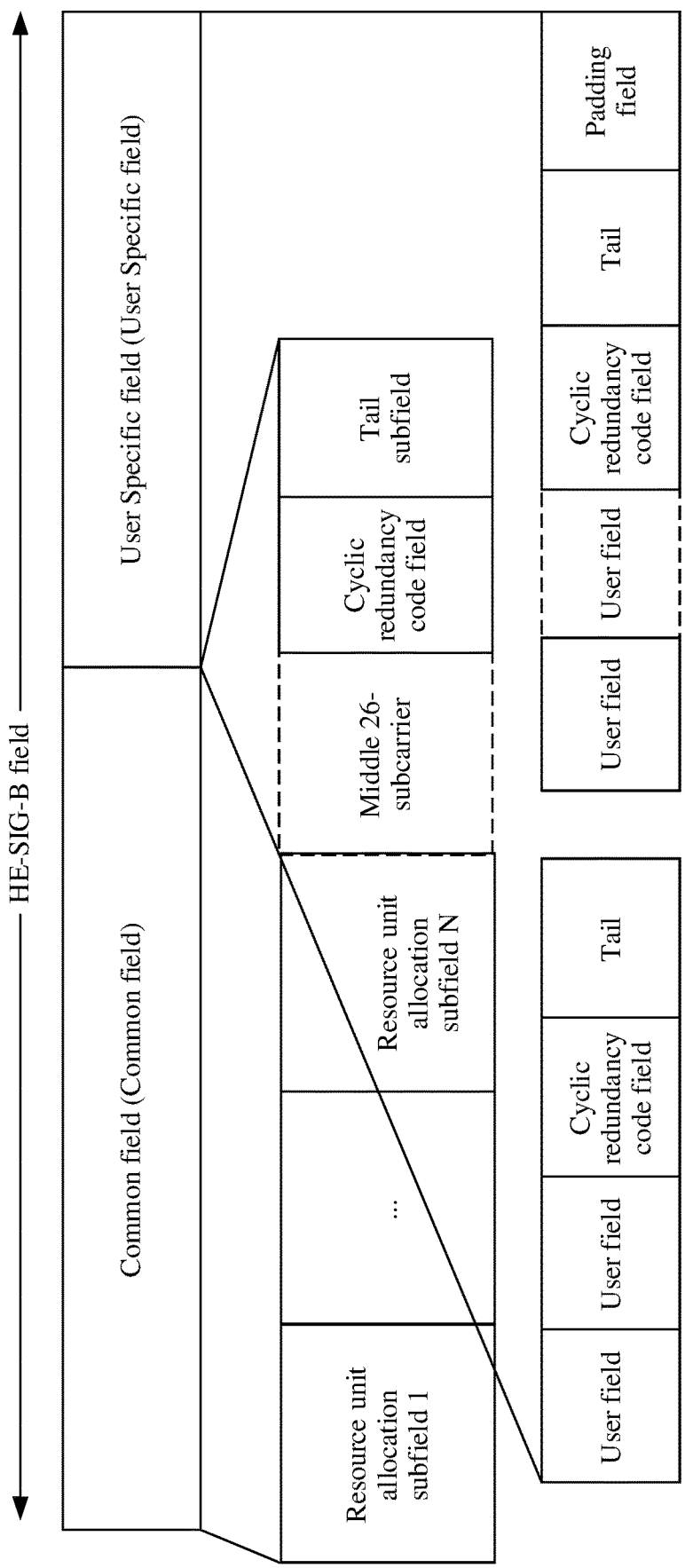
FIG. 3 is a schematic diagram of a frame structure of an HE-SIG-B according to an embodiment of this application.

FIG. 3 shows a format of an HE-SIG B field provided in the 802.11ax protocol. The HE-SIG-B is divided into two parts. The first part is a common field, including 1 to N resource unit allocation subfields (RU Allocation subfield), and a center 26-subcarrier (Center 26-Tone) resource unit indication field that exists when a bandwidth is greater than or equal to 80 MHz, and then, there are a cyclic redundancy code (CRC) used for check and a tail (Tail) subfield used for cyclic decoding. In addition, in a user specific field (User Specific field), there are 1 to M user fields (user field) in a resource unit allocation sequence. In the M user fields, two user fields form a group usually. Every two user fields are followed by a CRC and a tail field. The last group, however, should be excluded. In the last group, there may be one user field or two user fields, so that the user field in the last group is represented by a dashed line. A tail field in the last group of user fields may be followed by a padding (Padding) field.

One resource unit allocation subfield is one resource unit allocation index, and one resource unit allocation index indicates a size and a position of one or more resource units included in a 20 MHz channel. A sequence of at least one station field corresponds to the resource unit allocation sequence. Each station field indicates station information of an allocated STA in an RU included in resource unit allocation.

The resource unit allocation index is indicated by using one or more 8-bit sequences, where every eight bits correspond to one 20 MHz channel of a bandwidth spectrum. For example, in the 802.11ax standard, a resource unit allocation subfield index table is shown in Table 1. Because the index table indicates allocated resources, the index table may also be referred to as a resource allocation information table.

TABLE 1

Resource allocation information table

| Resource unit allocation subfield (B7, B6, B5, B4, B3, B2, B1, B0) | #1 | #2 | #3 | #4 | #5 | #6 | #7 | #8 | #9 | Quantity |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |
| 00001001 | 52 | 26 | 26 | 26 | 26 | 26 | 52 | | | 1 |
| 00001010 | 52 | 26 | 26 | 26 | 52 | 26 | 26 | | | 1 |
| 00001011 | 52 | 26 | 26 | 26 | 52 | 52 | | | | 1 |
| 00001100 | 52 | 52 | 26 | 26 | 26 | 26 | 26 | | | 1 |
| 00001101 | 52 | 52 | 26 | 26 | 26 | 52 | | | | 1 |
| 00001110 | 52 | 52 | 26 | 52 | 26 | 26 | | | | 1 |
| 00001111 | 52 | 52 | 26 | 52 | 52 | | | | | 1 |
| 00010$y_2y_1y_0$ | 52 | 52 | — | 106 | | | | | | 8 |
| 00011$y_2y_1y_0$ | 106 | — | 52 | 52 | | | | | | 8 |
| 00100$y_2y_1y_0$ | 26 | 26 | 26 | 26 | 26 | 106 | | | | 8 |
| 00101$y_2y_1y_0$ | 26 | 26 | 52 | 26 | 106 | | | | | 8 |
| 00110$y_2y_1y_0$ | 52 | 26 | 26 | 26 | 106 | | | | | 8 |
| 00111$y_2y_1y_0$ | 52 | 52 | 26 | 106 | | | | | | 8 |
| 01000$y_2y_1y_0$ | 106 | 26 | 26 | 26 | 26 | 26 | | | | 8 |
| 01001$y_2y_1y_0$ | 106 | 26 | 26 | 26 | 52 | | | | | 8 |
| 01010$y_2y_1y_0$ | 106 | 26 | 52 | 26 | 26 | | | | | 8 |
| 01011$y_2y_1y_0$ | 106 | 26 | 52 | 52 | | | | | | 8 |
| 0110$y_1y_0z_1z_0$ | 106 | — | 106 | | | | | | | 16 |
| 01110000 | 52 | 52 | — | 52 | 52 | | | | | 1 |
| 01110001 | 242-tone RU empty (zero station)-denoted as 242(0) | | | | | | | | | 1 |
| 01110010 | The resource unit allocation subfield of a content channel of the HE-SIG-B includes a 484-tone RU including zero user field, and is denoted as 484(0). | | | | | | | | | 1 |
| 01110011 | The resource unit allocation subfield of a content channel of the HE-SIG-B includes a 996-tone RU including zero user field, and is denoted as 996(0). | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | 106 | 26 | 106 | | | | | | | 64 |
| 11000$y_2y_1y_0$ | 242, denoted as 242(n), where n = 1 to 8 | | | | | | | | | 8 |
| 11001$y_2y_1y_0$ | 484, denoted as 484(n), where n = 1 to 8 | | | | | | | | | 8 |
| 11010$y_2y_1y_0$ | 996, denoted as 996(n), where n = 1 to 8 | | | | | | | | | 8 |
| 11011$y_2y_1y_0$ | Reserved | | | | | | | | | 8 |
| 111$x_4x_3x_2x_1x_0$ | Reserved | | | | | | | | | 32 |

In Table 1, the first column represents an 8-bit sequence, and the middle columns #1 to #9 represent different resource units. A number in the table represents a quantity of subcarriers included in the resource unit. For example, the sequence "00111$y_2y_1y_0$" indicates that an entire 242-tone RU is divided into four RUs: a 52-tone RU, a 52-tone RU, a 26-tone RU, and a 106-tone RU. The quantity in the third column indicates a quantity of entries allocated to a same resource unit, that is, a quantity of different sequences corresponding to a same resource unit arrangement manner. For the sequence "00111$y_2y_1y_0$", there are eight entries because when the 242-tone RU resource unit allocation manner is indicated, $y_2y_1y_0$ further indicates a quantity of users, in SU/MU-MIMO transmission, included in the 106-tone RU, and the quantity of users corresponds to one to eight users. In other words, 3-bit $y_2y_1y_0$ indicates one to eight users supported in the 106-tone RU. The eight entries can be considered as eight independent rows in the table. The eight rows correspond to a same resource unit allocation manner, and each row corresponds to a different quantity of users supported in the 106-tone RU. When a resource unit permutation and combination indicated by one resource unit allocation subfield includes a resource unit including more than or equal to 106 subcarriers, the resource unit allocation index further indicates a quantity of MU MIMO users supported by the resource unit including more than or equal to 106 subcarriers.

It should be understood that, when a bandwidth is 20 MHz, the entire bandwidth may include an entire 242-tone RU, or may include various combinations of a 26-tone RU, a 52-tone RU, and a 106-tone RU. It is similar to subcarrier distribution of the 20 MHz bandwidth that, when a bandwidth is 40 MHz, the entire bandwidth may include an entire 484-tone RU, or may include various combinations of a 26-tone RU, a 52-tone RU, a 106-tone RU, and a 242-tone RU. Similarly, when a bandwidth is 80 MHz, the entire bandwidth may include an entire 996-tone RU, or may include various combinations of a 26-tone RU, a 52-tone RU, a 106-tone RU, a 242-tone RU, and a 484-tone RU. For example, the 80 MHz bandwidth may include four resource units on a per 242-tone RU basis. When a bandwidth is 160 MHz or 80+80 MHz, the entire bandwidth may be considered as a duplication of subcarrier distribution of two 80 MHz channels. The entire bandwidth may include an entire 2*996-tone RU, or may include various combinations of a 26-tone RU, a 52-tone RU, a 106-tone RU, a 242-tone RU, a 484-tone RU, and a 996-tone RU.

The concept of content channel (CC) is further introduced in the 802.11ax standard. When a bandwidth is only 20 MHz, the HE-SIG-B includes only one CC, and the CC includes one resource unit allocation subfield, indicating an allocated RU in the 20 MHz bandwidth. The resource unit allocation subfield occupies eight bits, and all possible RU permutation and combination manners in the 20 MHz bandwidth may be indicated by using indexes. For an RU whose size is greater than or equal to 106-tone, a quantity of users in SU/MU-MIMO transmission in the RU or a quantity of user information fields in the RU further needs to be indicated, for example, by using a letter x or y in Table 1. For details, refer to the 802.11ax protocol.

If a transmission bandwidth is greater than 20 MHz, a legacy preamble (L-preamble), a repeated legacy signal (RL-SIG) in a high efficiency preamble (HE-preamble), and an HE-SIG-A field that are included in a PPDU are duplicated and transmitted every 20 MHz channel; however, the HE-SIG B uses a "1212" transmission method. To be specific, the HE-SIG B includes two CCs. One CC is transmitted on odd-numbered 20 MHz channels in the transmission bandwidth, and includes resource allocation information of the plurality of odd-numbered 20 MHz channels and station information transmitted on the plurality of odd-numbered 20 MHz channels. The other CC is transmitted on even-numbered 20 MHz channels in the transmission bandwidth, and includes resource allocation information of the plurality of even-numbered 20 MHz channels and station information transmitted on the plurality of even-numbered 20 MHz channels. It should be understood that content of a resource unit allocation subfield is partially displayed in each of the two CCs. A STA may learn, by reading the two CCs, of an RU into which a bandwidth spectrum resource is divided.

Figure 4:
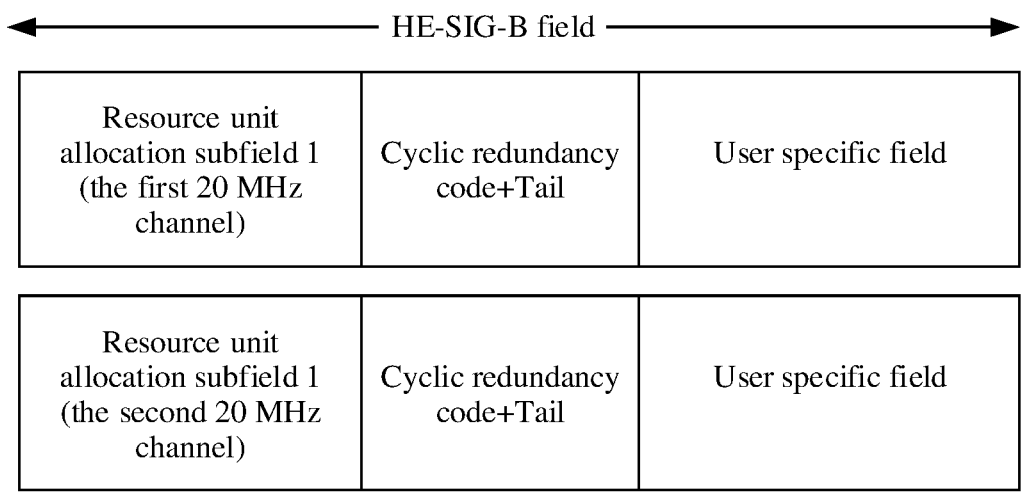
FIG. 4 is a schematic diagram of a frame structure of an HE-SIG-B when a bandwidth is 40 MHz according to an embodiment of this application.

For example, FIG. 4 shows a structure of an HE-SIG-B when a bandwidth is 40 MHz. When a bandwidth is 40 MHz, there are two CCs, and the two CCs are respectively a CC 1 and a CC 2. The CC 1 includes a resource unit allocation subfield and a corresponding user specific field in a range of an odd-numbered 20 MHz channel (namely, the first 20 MHz channel). The CC 2 includes a resource unit allocation subfield and a corresponding user specific field in a range of an even-numbered 20 MHz channel (namely, the second 20 MHz channel).

For another example, when a bandwidth is 80 MHz, there are still two CCs, and the two CCs are respectively a CC 1 and a CC 2. The CC 1 includes resource unit allocation subfields and corresponding user specific fields in a range of odd-numbered 242-subcarrier RUs (namely, the first 20 MHz channel and the third 20 MHz channel). The CC 2 includes resource unit allocation subfields and corresponding user specific fields in a range of even-numbered 242-subcarrier RUs (namely, the second 20 MHz channel and the fourth 20 MHz channel).

Although a plurality of RU allocation modes are specified for the resource unit allocation subfields shown in Table 1, in OFDMA transmission, to reduce sending and receiving complexity, in some embodiments, only allocation of one RU to one user is supported, and allocation of a plurality of RUs to one user is not supported, in other words, allocation of a plurality of consecutive or inconsecutive RUs to one user is not supported. For example, there are three RUs, and the three RUs are respectively an RU 1, an RU 2, and an RU 3. Channel conditions of the RU 1 and the RU 3 are better than a channel condition of the RU 2. In an ideal case, the RU 1 and the RU 3 may be allocated to a same user. However, only allocation of the RU 1 or the RU 3 to a same user is supported, and allocation of the RU 1 and RU 3 to a same user is not supported. It can be learned that RU allocation flexibility is low, and spectrum utilization is also low.

To improve the spectrum utilization, in a next generation protocol of 802.11ax, for example, 802.11be, a plurality of consecutive or inconsecutive RUs are allowed to be allocated to one or more users. In other words, SU transmission and MU-MIMO transmission on a plurality of inconsecutive RUs are supported. SU transmission and MU-MIMO transmission are relative to OFDMA transmission. Therefore, in some embodiments, SU transmission and MU-MIMO transmission may be collectively referred to as non-OFDMA transmission. For non-ODFMA transmission, if the foregoing resource allocation manner corresponding to OFDMA transmission is still used, as a bandwidth increases, more resource unit allocation subfields and more user specific fields are required, and signaling overheads are high. For example, there is a 320 MHz bandwidth, and the 320 MHz bandwidth is allocated to 40 users. In this case, at least 16 resource unit allocation subfields and user fields respectively corresponding to the 16 resource unit allocation subfields are required. Each resource unit allocation subfield occupies at least eight bits. It is clear that signaling overheads are high.

Figure 5:
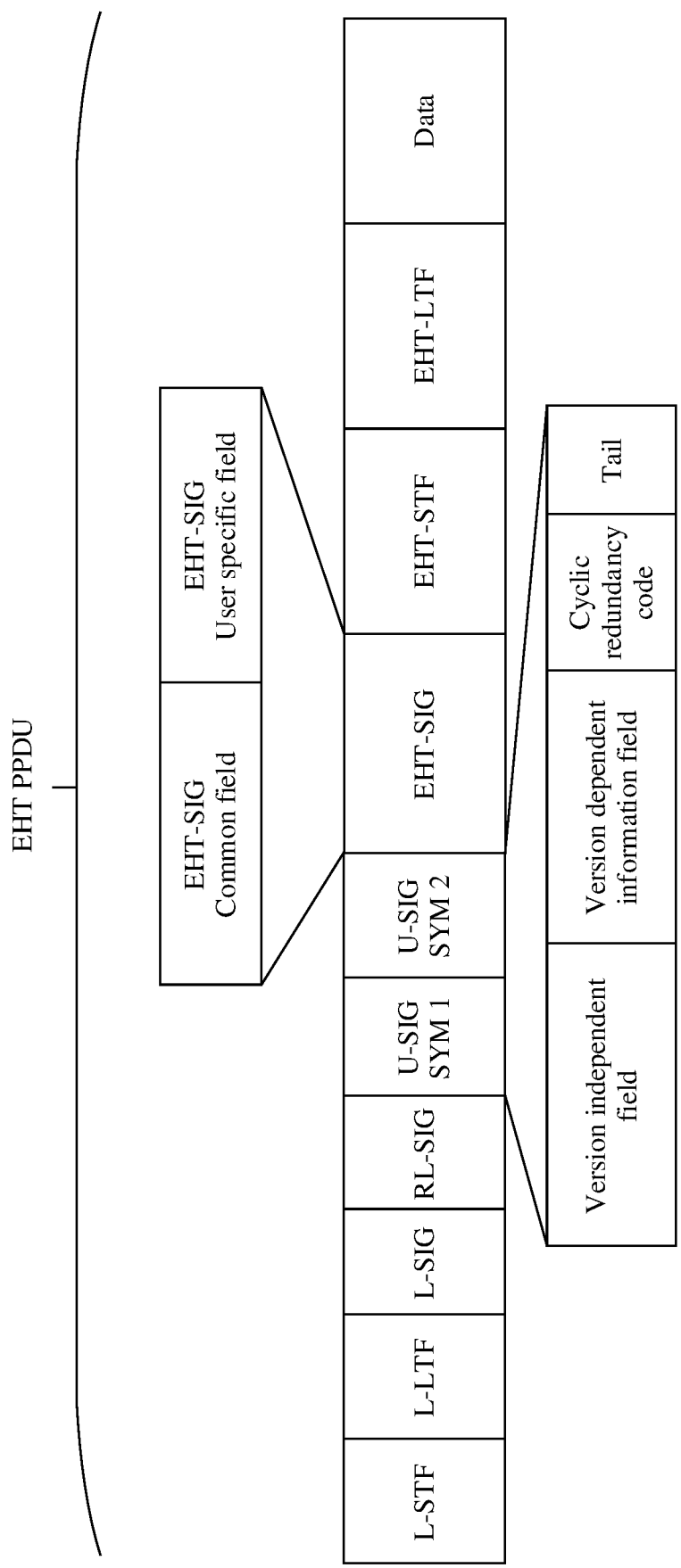
FIG. 5 is a schematic diagram of a frame structure of an EHT PPDU according to an embodiment of this application.

To reduce the signaling overheads, in some embodiments, an allocated resource is indicated to a user by using an EHT PPDU. FIG. 5 shows a structure of an EHT PPDU. The EHT PPDU may include three parts: a legacy preamble (L-preamble), a high efficiency preamble (HE-preamble), and a physical layer convergence protocol service data unit (PSDU). The L-preamble includes an L-STF field, an L-LTF field, and an L-SIG field. The HE-preamble includes an RL-SIG field, a universal signal (U-SIG) field, an extremely high throughput signal (EHT-SIG) field, an extremely high throughput short training field (EHT-STF), and an extremely high throughput long training field (EHT-LTF). The PSDU includes fields such as a data (data) field. The U-SIG field occupies two OFDM symbols, for example, a U-SIG SYM 1 and a U-SIG SYM 2 shown in FIG. 5. The universal signal (U-SIG) field may include a version independent information (version independent info) field, a version dependent information (version dependent info) field, a CRC field, and a tail field. The version independent information field may include a 3-bit Wi-Fi version field, a 1-bit downlink/uplink field, an at least 6-bit BSS color field, and an at least 7-bit TxOP field. Further, the version independent information field may further include a bandwidth field. The version dependent information field may include a PPDU format field and the like, and may further include one or more of a modulation and coding scheme field, a spatial stream field, a coding field, and the like. The CRC field occupies at least four bits, and the tail field occupies at least six bits.

In a possible implementation, the EHT-SIG field includes an EHT-SIG common field and an EHT-SIG user specific field. The EHT-SIG common field may be used to carry resource allocation information allocated to a STA. The EHT-SIG user specific field may be used to carry user information. Allocation of a 320 MHz bandwidth is used as an example. If a structure in 802.11ax is still used, a user only needs to read content of a primary 80 MHz channel in the 320 MHz bandwidth at and before the EHT-SIG field, to learn of an allocated resource, in other words, information about resources allocated to all users is carried on the primary 80 MHz channel, and overheads on the primary 80 MHz channel are very high.

However, to further reduce the overheads (for example, reduce a length of the EHT-SIG field), in a discussion process of the 802.11be standard, it is proposed that a full bandwidth may be segmented based on an EHT PPDU, or it may be understood that a new PPDU structure is proposed. For example, FIG. 6 shows an example of the new PPDU structure. In FIG. 6, an example in which a channel bandwidth (which may be referred to as a full bandwidth or a full frequency band in this specification) for transmitting a PPDU is 320 MHz is used. It may be learned that in FIG. 6, the 320 MHz bandwidth is divided into four frequency domain segments (segment), each frequency domain segment is 80 MHz, and the first 80 MHz channel is a primary 80 MHz channel. Because each frequency domain segment is 80 MHz, in some embodiments, the frequency domain segment may also be referred to as an 80 MHz segment. Based on the structure shown in FIG. 6, a U-SIG field may be repeated only in each frequency domain segment (80 MHz), and different U-SIG fields and EHT-SIG fields may be used for different frequency domain segments. It should be understood that, for a frequency domain segment greater than or equal to 40 MHz, an EHT-SIG field in each frequency domain segment may have two or more content channels. Each frequency domain segment may include, in a U-SIG field, only a puncturing indication of the 80 MHz frequency domain segment. This architecture is equivalent to that overheads of a U-SIG field and an EHT-SIG field on an original primary 80 MHz channel are allocated to the four frequency domain segments, so that overheads can be reduced.

For example, a 320 MHz bandwidth is allocated to 40 users. If the PPDU structure shown in FIG. 6 is not used, and the structure in 802.11ax is still used, a PPDU needs at least 16 EHT-SIG fields, and the EHT-SIG fields need at least 40 user fields. In this way, punctured 20 MHz channels of the 320 MHz bandwidth can be learned of by reading content of a primary 80 MHz channel of the 320 MHz bandwidth, and then an allocated resource can be learned of by reading the EHT-SIG field. However, if the PPDU structure shown in FIG. 6 is used, because frequency domain segmentation is performed on the 320 MHz bandwidth, each frequency domain segment (80 MHz) has one primary 20 MHz channel. There are also 40 users. Some users park (park) in the first frequency domain segment of the four frequency domain segments, some users park in the second frequency domain segment of the four frequency domain segments, some users park in the third frequency domain segment of the four frequency domain segments, and some users park in the fourth frequency domain segment of the four frequency domain segments. Correspondingly, the U-SIG field may be repeated only in each frequency domain segment (80 MHz). Different U-SIG fields and EHT-SIG fields may be used for different frequency domain segments. Because overheads of an EHT-SIG field on an original primary 80 MHz channel may be allocated to the four frequency domain segments, the user fields corresponding to the 40 users may also be respectively transmitted in the four frequency domain segments. In this way, there are less than 40 user fields in the EHT-SIG fields in each frequency domain segment, so that overheads can be reduced. Still using the foregoing example, if 10 users park in each frequency domain segment, the EHT-SIG fields in each frequency domain segment need only about 10 user fields. It is clear that overheads can be reduced.

It should be noted that, in FIG. 6, only an example in which sizes of all the frequency domain segments are the same is used. However, the size of each frequency domain segment is not limited in this embodiment of this application, and the bandwidth of each frequency domain segment is variable. For example, the 320 MHz bandwidth may be divided into three frequency domain segments, and the three frequency domain segments are respectively 80 MHz, 80 MHz, and 160 MHz.

It should be understood that, it may be considered that a plurality of inconsecutive RUs are formed through preamble puncturing on the full bandwidth. Therefore, for non-OFDMA transmission, indicating, to a user, that an allocated resource belongs to a part of resources in the full bandwidth is equivalent to indicating, to the user, a preamble puncturing combination status supported in non-OFDMA transmission.

Therefore, in some other embodiments, for a STA in non-OFDMA transmission, the U-SIG field may indicate a bandwidth allocated to the STA, and the U-SIG field and/or the EHT-SIG field may indicate a puncturing status of the bandwidth. Because both the U-SIG field and the EHT-SIG field may indicate the puncturing status, for ease of distinguishing, in this embodiment of this application, a field that is in the U-SIG field and that is used to carry the puncturing status is referred to as a preamble puncturing information field A, and a field that is in the EHT-SIG field and that is used to carry the puncturing status is a preamble puncturing information field B. It should be understood that the preamble puncturing information field A or the preamble puncturing information field B may not only indicate the puncturing status of the bandwidth. From another perspective, the puncturing status of the bandwidth may also be indicated as a resource allocated to a user. Therefore, it may also be considered that the preamble puncturing information field A or the preamble puncturing information field B indicates a resource allocation status. It should be noted that a specific name of the field used to carry the puncturing status is not limited in this embodiment of this application. In other words, the preamble puncturing information field A and/or the preamble puncturing information field B may have other names/another name in some embodiments. In this specification, a field used to carry a puncturing status is referred to as a preamble puncturing information field.

In a possible implementation, the EHT PPDU may include the preamble puncturing information field A and the preamble puncturing information field B. To be specific, the preamble puncturing information field A and the preamble puncturing information field B indicate puncturing information in non-OFDMA transmission (where this manner may also be referred to as a puncturing indication manner 1 in non-OFDMA transmission). The preamble puncturing information field A may be used to carry puncturing information of the 80 MHz channel corresponding to each frequency domain segment in FIG. 6. A user may learn, by reading the preamble puncturing information field A, of a puncturing status of an 80 MHz channel corresponding to a frequency domain segment in which the user is located, so as to complete reading the preamble puncturing information field B in the EHT-SIG field. The preamble puncturing information field B may include a puncturing status of an entire frequency band (for example, a puncturing status of a 320 MHz bandwidth).

For example, the preamble puncturing information field A may occupy three bits, and the three bits may indicate a puncturing status in an 80 MHz bandwidth. For example, the 80 MHz bandwidth may be divided into four 20 MHz channels based on a 20 MHz granularity. It should be understood that puncturing in the 80 MHz bandwidth means puncturing one or more 20 MHz channels in the 80 MHz bandwidth. The four 20 MHz channels included in the 80 MHz bandwidth are sorted in ascending order of frequencies. If none of the four 20 MHz channels in the 80 MHz bandwidth is punctured, it may be denoted as [1 1 1 1]. It should be understood that 1 indicates a non-punctured state, and PPDU information is transmitted on a corresponding channel. If the first 20 MHz channel in the 80 MHz bandwidth is punctured, it may be denoted as [x 1 1 1]. If the second 20 MHz channel in the 80 MHz bandwidth is punctured, it may be denoted as [1 x 1 1]. The rest can be deduced by analogy, and the puncturing status in the 80 MHz bandwidth may be [1 1 1 1], [x 1 1 1], [1 x 1 1], [1 1 x 1], [1 1 1 x], [x x 1 1], and [1 1 x x]. It should be understood that "x" indicates a punctured state, and PPDU information is not transmitted on a corresponding channel. Certainly, in this embodiment of this application, "x" merely indicates the punctured state. In some embodiments, the punctured state may alternatively be indicated in another manner. For example, "0" may indicate the punctured state. For example, [1 0 1 1] indicates that the second 20 MHz channel in the 80 MHz bandwidth is punctured. It should be noted that a punctured state indication manner is not limited in this embodiment of this application. The punctured state may be indicated by using "x" or "0", or the punctured state may be indicated by using another possible symbol, provided that indications of the non-punctured state and the punctured state can be distinguished. In this specification, an example in which "x" indicates the punctured state is used.

It should be noted that, for a full bandwidth of 80 MHz, as shown in FIG. 7, the 80 MHz bandwidth includes a primary 20 MHz channel (denoted as P20), a secondary 20 MHz channel (denoted as S20), and a secondary 40 MHz channel (denoted as S40). S40 is further divided into S40-L (a left 20 MHz channel in S40) and S40-R (a right 20 MHz channel in S40). A puncturing status corresponding to the 80 MHz bandwidth may be shown in FIG. 7. In (a) in FIG. 7, only S20 in the 80 MHz bandwidth is punctured. In (b) and (c) in FIG. 7, only one 20 MHz channel in S40 in the 80 MHz bandwidth is punctured. In other words, in ascending order of frequencies, the 80 MHz bandwidth sequentially includes the first 20 MHz channel, the second 20 MHz channel, the third 20 MHz channel, and the fourth 20 MHz channel, and the puncturing status corresponding to the 80 MHz bandwidth includes that the 80 MHz bandwidth is not punctured or that only one 20 MHz channel is punctured, in other words, the puncturing status of the 80 MHz bandwidth may include [1 1 1 1], [x 1 1 1], [1 x 1 1], [1 1 x 1], and [1 1 1 x].

However, in this embodiment, the preamble puncturing information field A may be used to carry the puncturing information of the 80 MHz channel corresponding to each frequency domain segment in FIG. 6. In other words, the 80 MHz bandwidth in this embodiment may be a frequency domain segment, instead of a full bandwidth of 80 MHz. For example, a full bandwidth is 160 MHz, and may be divided into two frequency domain segments, and each frequency domain segment is 80 MHz. A 40 MHz channel in the 160 MHz bandwidth may be punctured. Therefore, a puncturing status of the 160 MHz bandwidth may include [x x 1 1 1 1 1 1], [1 1 x x 1 1 1 1], [1 1 1 1 x x 1 1], and [1 1 1 1 1 1 x x]. From this perspective, for the 80 MHz frequency domain segment, a puncturing status may further include [x x 1 1] and [1 1 x x].

In another possible implementation, the EHT PPDU includes the preamble puncturing information field A, and does not include the preamble puncturing information field B. To be specific, when the preamble puncturing information field A indicates puncturing information in non-OFDMA transmission (where this manner may also be referred to as a puncturing indication manner 2 in non-OFDMA transmission), the preamble puncturing information field A may indicate possible puncturing statuses of a 320 MHz bandwidth and all the following bandwidths. Because the preamble puncturing information field A can already notify all the supported puncturing statuses, the preamble puncturing information field B does not need to be used for indication.

Still using the foregoing example, it should be understood that an 80 MHz bandwidth may not be punctured, or a 20 MHz channel in the 80 MHz bandwidth may be punctured. A puncturing status of the 80 MHz bandwidth may include [1 1 1 1], [x 1 1 1], [1 x 1 1], [1 1 x 1], and [1 1 1 x].

Similarly, a 160 MHz bandwidth may not be punctured, or a 20 MHz channel or a 40 MHz channel in the 160 MHz bandwidth may be punctured. If the 160 MHz bandwidth is not punctured, a puncturing status of the 160 MHz bandwidth may include [1 1 1 1 1 1 1 1]. If the 20 MHz channel is punctured, puncturing statuses of the 160 MHz bandwidth may include [x 1 1 1 1 1 1 1], [1 x 1 1 1 1 1 1], [1 1 x 1 1 1 1 1], [1 1 1 x 1 1 1 1], [1 1 1 1 x 1 1 1], [1 1 1 1 1 x 1 1], [1 1 1 1 1 1 x 1], and [1 1 1 1 1 1 1 x]. If the 40 MHz channel is punctured, puncturing statuses of the 160 MHz bandwidth may include [x x 1 1 1 1 1 1], [1 1 x x 1 1 1 1], [1 1 1 1 x x 1 1], and [1 1 1 1 1 1 x x].

Similarly, a 240 MHz bandwidth may not be punctured, or a 40 MHz channel or an 80 MHz channel may be punctured. If the 240 MHz bandwidth is not punctured, a puncturing status of the 240 MHz bandwidth may include [1 1 1 1 1 1

1 1 1 1 1 1]. If the 40 MHz channel is punctured, puncturing statuses of the 240 MHz bandwidth may include [x x 1 1 1 1 1 1 1 1 1 1], [1 1 x x 1 1 1 1 1 1 1 1], [1 1 1 1 x x 1 1 1 1 1 1], [1 1 1 1 1 1 x x 1 1 1 1], [1 1 1 1 1 1 1 1 x x 1 1], and [1 1 1 1 1 1 1 1 1 1 x x]. If the 80 MHz channel is punctured, puncturing statuses of the 240 MHz bandwidth may include [1 1 1 1 x x x x 1 1 1 1] and [1 1 1 1 1 1 1 1 x x x x].

Similarly, a 320 MHz bandwidth may not be punctured, or an 80 MHz channel or a 120 MHz channel may be punctured. If the 320 MHz bandwidth is not punctured, a puncturing status of the 320 MHz bandwidth may include [1 1 1 1 1 1 1 1 1 1 1 1 1 1 1 1]. If the 80 MHz channel is punctured, puncturing statuses of the 320 MHz bandwidth may include [x x 1 1 1 1 1 1 1 1 1 1 1 1 1 1], [1 1 x x 1 1 1 1 1 1 1 1 1 1 1 1], [1 1 1 1 x x 1 1 1 1 1 1 1 1 1 1], [1 1 1 1 1 1 x x 1 1 1 1 1 1 1 1], [1 1 1 1 1 1 1 1 x x 1 1 1 1 1 1], [1 1 1 1 1 1 1 1 1 1 x x 1 1 1 1], [1 1 1 1 1 1 1 1 1 1 1 1 x x 1 1], and [1 1 1 1 1 1 1 1 1 1 1 1 1 1 x x]. If the 120 MHz channel is punctured, puncturing statuses of the 320 MHz bandwidth may include [1 1 1 1 x x x x 1 1 1 1 1 1 1 1], [1 1 1 1 1 1 1 1 x x x x 2 1 1 1], and [1 1 1 1 1 1 1 1 1 1 1 1 x x x x].

It can be learned from the foregoing descriptions that in each bandwidth, because there are a maximum of 16 puncturing statuses, the preamble puncturing information field A occupies at least four bits, to indicate a resource unit allocated to a STA in non-OFDMA transmission.

Although the frequency domain segmentation may be performed on the full bandwidth by using the PPDU structure shown in FIG. 6, and the signaling overheads can be reduced by allocating the overheads of the EHT-SIG field to the plurality of frequency domain segments, there is no further solution to how to indicate an allocated resource to a user by using the PPDU structure shown in FIG. 6, that is, there is no corresponding design solution for the EHT-SIG field.

To resolve the foregoing technical problem, an embodiment of this application provides a resource indication method. In the method, an AP may reuse a field in a U-SIG field and/or an EHT-SIG field to indicate a plurality of consecutive or inconsecutive RUs allocated to a user. It may alternatively be considered that, this embodiment of this application provides a new design solution of a U-SIG field and an EHT-SIG field. The new design solution can further reduce signaling overheads in comparison with using a resource unit allocation subfield in 802.11ax to indicate an allocated resource to a user.

The technical solutions provided in embodiments of this application are described below with reference to the accompanying drawings. The technical solutions provided in embodiments of this application may be applied to the scenario shown in FIG. 1, and certainly may further be applied to another possible communication scenario or communication system. This is not limited in embodiments of this application. It should be understood that the technical solutions provided in embodiments of this application are performed by a sending device and a receiving device. In descriptions of this specification, the sending device is also referred to as a transmit end, and the receiving device is also referred to as a receive end. In the following descriptions, an example in which the transmit end is an AP and the receive end is a STA is used.

Figure 8:
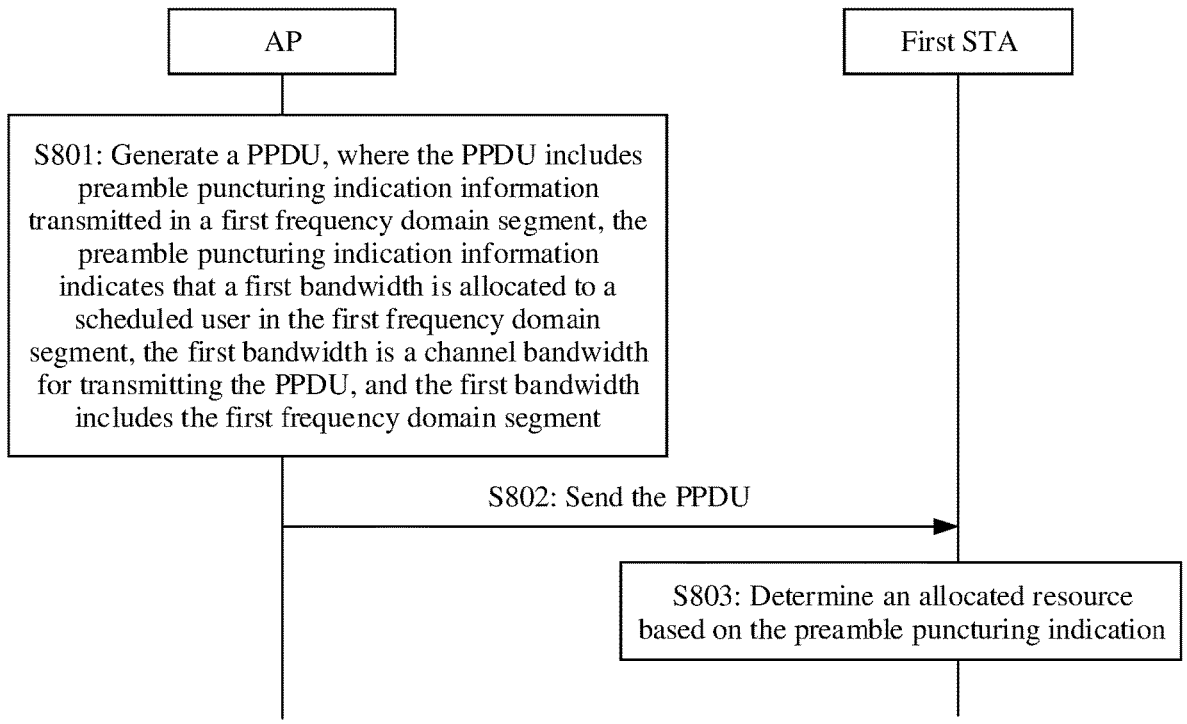
FIG. 8 is a schematic flowchart of a resource indication method according to an embodiment of this application.

FIG. 8 is a schematic flowchart of a resource indication method according to an embodiment of this application. The method includes the following steps.

S801: An AP generates a PPDU, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment.

S802: The AP sends the PPDU, and a STA receives the PPDU.

S803: The STA determines an allocated resource based on the preamble puncturing indication information.

It should be understood that when notifying each STA to send data, the AP needs to notify each STA of an RU allocated by the AP to the STA. In this embodiment of this application, the first bandwidth may be considered as a full bandwidth, namely, a bandwidth configuration supported by a system, for example, 20 MHz, 40 MHz, 80 MHz, 160 MHz, 240 MHz, or 320 MHz. To reduce signaling overheads, in this embodiment of this application, the frequency domain segment structure of the EHT PPDU shown in FIG. 6 may be used to notify the STA of the allocated resource. It should be understood that, in a frequency domain segment scenario, the first bandwidth is greater than or equal to 80 MHz, and the first bandwidth may be divided into one or more frequency domain segments. A quantity of frequency domain segments is not limited in this embodiment of this application. To be specific, sizes of different frequency domain segments may be the same or may be different. For example, a 320 MHz bandwidth may be divided into four 80 MHz frequency domain segments, or may be divided into two 80 MHz frequency domain segments and one 160 MHz frequency domain segment.

A preamble puncturing information field may indicate a resource allocation status in each frequency domain segment. It should be understood that the resource allocation status is for a user parking (parking) in each frequency domain segment. In other words, the preamble puncturing information field may indicate the resource allocation status of the user in each frequency domain segment. For example, a resource unit may be allocated to or no resource unit may be allocated to a STA in a frequency domain segment. If no resource is allocated to a STA in a frequency domain segment, the STA does not need to read an EHT-SIG field in the EHT PPDU, so that energy consumption can be reduced. Therefore, in some embodiments, the preamble puncturing information field may indicate that no resource unit is allocated to a user in a frequency domain segment.

In a possible implementation, the preamble puncturing information field may be carried in a field of a U-SIG field. For ease of description, in this embodiment of this application, the field is referred to as a first field. The first field may be a field defined in the U-SIG field, or may be a newly added field in the U-SIG field. In this embodiment of this application, the frequency domain segment structure of the EHT PPDU may still be used. Therefore, the first field may be the foregoing preamble puncturing information field A.

It should be understood that the preamble puncturing information field A may occupy a plurality of bits, and may indicate a resource allocation status in one frequency domain segment. For example, for an 80 MHz frequency domain segment, the preamble puncturing information field A may occupy three bits. For a frequency domain segment greater than or equal to 160 MHz, the preamble puncturing information field A may occupy at least three bits. Table 2 shows content that may be indicated by the preamble puncturing information field A for the 80 MHz frequency domain segment.

TABLE 2

Meaning of the preamble puncturing
information field A in the U-SIG field

| State | Content (resource allocation status) |
|---|---|
| 000(0) | [1 1 1 1] (indicating that the 80 MHz frequency domain segment is not punctured) |
| 001(1) | [x 1 1 1] (indicating that the first 20 MHz channel in the 80 MHz frequency domain segment is punctured) |
| 010(2) | [1 x 1 1] (indicating that the second 20 MHz channel in the 80 MHz frequency domain segment is punctured) |
| 011(3) | [1 1 x 1] (indicating that the third 20 MHz channel in the 80 MHz frequency domain segment is punctured) |
| 100(4) | [1 1 1 x] (indicating that the fourth 20 MHz channel in the 80 MHz frequency domain segment is punctured) |
| 101(5) | [x x 1 1] (indicating that the first and the second 20 MHz channels in the 80 MHz frequency domain segment are punctured) |
| 110(6) | [1 1 x x] (indicating that the third and the fourth 20 MHz channels in the 80 MHz frequency domain segment are punctured) |
| 111(7) | Reserved (Reserved) |

It should be understood that a value of a 3-bit sequence carried in the preamble puncturing information field A in Table 2 represents a resource allocation status. It should be noted that Table 2 merely shows a correspondence between a value of the 3-bit sequence and a resource allocation status. A specific correspondence between a value of the 3-bit sequence and a resource allocation status is not limited in this embodiment of this application. For example, when the 3-bit sequence is "111", it may indicate that the 80 MHz frequency domain segment is not punctured (namely, a state corresponding to [1 1 1 1]). When the 3-bit sequence is "110", it may indicate that the first 20 MHz channel in the 80 MHz frequency domain segment is punctured (namely, a state corresponding to [x 1 1 1]). Examples are not listed one by one herein. The following uses the correspondence shown in Table 2 as an example. In this embodiment of this application, an entry of "no resource unit is allocated" may be added to Table 2. In other words, the reserved entry in Table 2 represents "no resource unit is allocated". If no resource unit is allocated to a STA in an 80 MHz frequency domain segment, "111" may be carried by using the preamble puncturing information field A. Because the STA needs to read a primary 20 MHz channel of the 80 MHz frequency domain segment, the STA reads the U-SIG field. When the STA determines, by using the preamble puncturing information field A, that no resource unit is allocated, the STA does not need to continue to read a field such as the EHT-SIG field following the U-SIG field, so that energy consumption of the STA can be reduced. Because no resource unit is allocated to the STA, the STA naturally does not need to read a user field in the EHT-SIG field to determine resources allocated to the STA. Alternatively, it may be considered that, in this case, the user field in the EHT-SIG field is unnecessary. Therefore, the preamble puncturing information field A indicates that no resource unit is allocated to the user in the frequency domain segment, and the EHT-SIG field may not include the user field, so that signaling overheads are reduced as much as possible.

It should be understood that, when a bandwidth field in the U-SIG field indicates that a bandwidth is 80 MHz, the preamble puncturing information field A indicates that a puncturing status exists. In a non-OFDMA transmission mode, there can be only one puncture, in other words, only one channel can be punctured. If the punctured channel is already indicated by the preamble puncturing information field A, the STA in the frequency domain segment may learn of resource allocation in the non-OFDMA transmission mode as indicated by the bandwidth field in the U-SIG field. However, because a remaining channel is not punctured, a preamble puncturing information field B does not need to be used for an additional indication, so that signaling overheads are reduced as much as possible.

Certainly, if a bandwidth indicated by a bandwidth field in the U-SIG field is less than or equal to 80 MHz, because the preamble puncturing information field A may indicate all puncturing statuses of an 80 MHz channel, the preamble puncturing information field B does not need to be used for an additional indication, so that signaling overheads can be reduced.

If a bandwidth field in the U-SIG field indicates that a bandwidth is greater than 80 MHz, and the preamble puncturing information field A includes only a puncturing status corresponding to each 80 MHz frequency domain segment, the STA may learn, by using the preamble puncturing information field A, of a puncturing status of an 80 MHz channel corresponding to the frequency domain segment in which the STA is located, so as to complete reading the preamble puncturing information field B in the EHT-SIG field on a non-punctured channel. In this case, the preamble puncturing information field may be carried in the preamble puncturing information field A and the preamble puncturing information field B. The preamble puncturing information field A may occupy a plurality of bits, and the preamble puncturing information field B also occupies a plurality of bits. When a puncturing status, in a corresponding 80 MHz frequency domain segment, indicated by the preamble puncturing information field A is as that shown in Table 2, content indicated by the preamble puncturing information field B may be shown in Table 3.

TABLE 3

Meaning of the preamble puncturing information field B in the EHT-SIG field

| Bandwidth | Preamble puncturing information field A | Preamble puncturing information field B (index) | Specific mode (corresponding to a frequency band puncturing status other than the puncturing status indicated by the preamble puncturing information field A) |
|---|---|---|---|
| 160 MHz | [1 1 1 1] | 0 | [1 1 1 1] |
| | | 1 | [x 1 1 1] |
| | | 2 | [1 x 1 1] |
| | | 3 | [1 1 x 1] |
| | | 4 | [1 1 1 x] |
| | | 5 | [x x 1 1] |

TABLE 3-continued

Meaning of the preamble puncturing information field B in the EHT-SIG field

| Bandwidth | Preamble puncturing information field A | Preamble puncturing information field B (index) | Specific mode (corresponding to a frequency band puncturing status other than the puncturing status indicated by the preamble puncturing information field A) |
|---|---|---|---|
| | | 6 | [1 1 x x] |
| | | 7-15 | Reserved |
| | [x 1 1 1] | 0 | [1 1 1 1] |
| | | 1-15 | Reserved |
| | [1 x 1 1] | 0 | [1 1 1 1] |
| | | 1-15 | Reserved |
| | [1 1 x 1] | 0 | [1 1 1 1] |
| | | 1-15 | Reserved |
| | [1 1 1 x] | 0 | [1 1 1 1] |
| | | 1-15 | Reserved |
| | [x x 1 1] | 0 | [1 1 1 1] |
| | | 1-15 | Reserved |
| | [1 1 x x] | 0 | [1 1 1 1] |
| | | 1-15 | Reserved |
| 240 MHz | [1 1 1 1] | 0 | [1 1 1 1 1 1 1 1] |
| | | 1 | [1 1 1 1 x x x x] |
| | | 2 | [x x x x 1 1 1 1] |
| | | 3 | [x x 1 1 1 1 1 1] |
| | | 4 | [1 1 x x 1 1 1 1] |
| | | 5 | [1 1 1 1 x x 1 1] |
| | | 6 | [1 1 1 1 1 1 x x] |
| | | 7-15 | Reserved |
| | [x x 1 1] | 0 | [1 1 1 1 1 1 1 1] |
| | | 1-15 | Reserved |
| | [1 1 x x] | 0 | [1 1 1 1 1 1 1 1] |
| | | 1-15 | Reserved |
| 320 MHz | [1 1 1 1] | 0 | [1 1 1 1 1 1 1 1 1 1 1 1] |
| | | 1 | [x x x x 1 1 1 1 1 1 1 1] |
| | | 2 | [1 1 1 1 x x x x 1 1 1 1] |
| | | 3 | [1 1 1 1 1 1 1 1 x x x x] |
| | | 4 | [x x 1 1 1 1 1 1 1 1 1 1] |
| | | 5 | [1 1 x x 1 1 1 1 1 1 1 1] |
| | | 6 | [1 1 1 1 x x 1 1 1 1 1 1] |
| | | 7 | [1 1 1 1 1 1 x x 1 1 1 1] |
| | | 8 | [1 1 1 1 1 1 1 1 x x 1 1] |
| | | 9 | [1 1 1 1 1 1 1 1 1 1 x x] |
| | | 10-15 | Reserved |
| | [x x 1 1] | 0 | [1 1 1 1 1 1 1 1] |
| | | 1-15 | Reserved |
| | [1 1 x x] | 0 | [1 1 1 1 1 1 1 1] |
| | | 1-15 | Reserved |

Table 3 may be considered as a design of the preamble puncturing information field B, and is used for a puncturing status of a bandwidth greater than 80 MHz. It should be understood that a puncturing status of a bandwidth greater than 80 MHz, for example, a puncturing status of a 160 MHz bandwidth, a 240 MHz bandwidth, or a 320 MHz bandwidth, is indicated by using the preamble puncturing information field A and the preamble puncturing information field B. The preamble puncturing information field A indicates a puncturing status in a frequency domain segment corresponding to an 80 MHz channel, and the preamble puncturing information field B indicates a puncturing status of a remaining frequency band in a full bandwidth other than the frequency domain segment.

In Table 3, for example, the preamble puncturing information field A occupies three bits, and the preamble puncturing information field B occupies four bits. An index of the preamble puncturing information field B may be considered as a value of the preamble puncturing information field B. The value indicates the puncturing status of the remaining frequency band in the full bandwidth other than the frequency domain segment. It should be noted that Table 3 merely shows a correspondence between a puncturing status and values of the preamble puncturing information field A and the preamble puncturing information field B, and a specific correspondence between a puncturing status and values of the preamble puncturing information field A and the preamble puncturing information field B is not limited in this embodiment of this application. For example, when the preamble puncturing information field A carries "111", it may indicate that the first 80 MHz channel in a 160 MHz bandwidth is not punctured (namely, a state corresponding to [1 1 1 1]). When the preamble puncturing information field B carries "111", it may indicate that the second 80 MHz channel in the 160 MHz bandwidth is not punctured (namely, a state corresponding to [1 1 1 1]). Examples are not listed one by one herein.

The correspondence shown in Table 3 is used as an example. For example, a full bandwidth is 160 MHz and includes two 80 MHz channels, and the preamble puncturing information field A indicates [1 1 1 1], that is, a corresponding 80 MHz channel is not punctured. If the value of the preamble puncturing information field B is 0, it indicates that the other 80 MHz channel of the 160 MHz bandwidth is not punctured either; or if the value of the preamble puncturing information field B is 5, it indicates that the first 20 MHz and the second 20 MHz channels in the other 80 MHz channel of the 160 MHz bandwidth are punctured. It should be understood that if the value of the preamble puncturing information field B ranges from 7 to 15, the preamble puncturing information field B may be reserved for other purposes.

It should be understood that, if the preamble puncturing information field A indicates [x 1 1 1], [1 x 1 1], [1 1 x 1], [1 1 1 x], [x x 1 1], or [1 1 x x], that is, a corresponding 80 MHz channel is punctured, because there can be only one puncture in the full bandwidth, the other 80 MHz channel of the 160 MHz bandwidth can only be not punctured. If the value of the preamble puncturing information field B is 0, it indicates that the other 80 MHz channel of the 160 MHz bandwidth is not punctured. If the value of the preamble puncturing information field B ranges from 1 to 15, the preamble puncturing information field B may be reserved for other purposes.

Similarly, for example, a full bandwidth is 240 MHz and includes three 80 MHz channels, and the preamble puncturing information field A indicates [1 1 1 1], that is, a corresponding 80 MHz channel is not punctured. If the value of the preamble puncturing information field B is 0, it indicates that the other 160 MHz channel of the 240 MHz bandwidth is not punctured either; or if the value of the preamble puncturing information field B is 5, it indicates that the fifth 20 MHz and the sixth 20 MHz channels in the other 160 MHz channel of the 240 MHz bandwidth are punctured. It should be understood that if the value of the preamble puncturing information field B ranges from 7 to 15, the preamble puncturing information field B may be reserved for other purposes.

It should be understood that, if the preamble puncturing information field A indicates [x x 1 1] or [1 1 x x], that is, a corresponding 80 MHz channel is punctured, because the remaining 160 MHz channel of the 240 MHz bandwidth can only be not punctured. If the value of the preamble puncturing information field B is 0, it indicates that the remaining 160 MHz channel of the 240 MHz bandwidth is not punctured. If the value of the preamble puncturing information field B ranges from 1 to 15, the preamble puncturing information field B may be reserved for other purposes.

Similarly, for example, a full bandwidth is 320 MHz and includes four 80 MHz channels, and the preamble puncturing information field A indicates [1 1 1 1], that is, a corresponding 80 MHz channel is not punctured. If the value of the preamble puncturing information field B is 0, it indicates that the other 240 MHz channel of the 320 MHz bandwidth is not punctured either; or if the value of the preamble puncturing information field B is 9, it indicates that the eleventh 20 MHz and the twelfth 20 MHz channels in the other 240 MHz channel of the 320 MHz bandwidth are punctured. It should be understood that if the value of the preamble puncturing information field B ranges from 10 to 15, the preamble puncturing information field B may be reserved for other purposes.

It should be understood that, if the preamble puncturing information field A indicates [x x 1 1] or [1 1 x x], that is, a corresponding 80 MHz channel is punctured, because the remaining 240 MHz channel of the 320 MHz bandwidth can only be not punctured. If the value of the preamble puncturing information field B is 0, it indicates that the remaining 240 MHz channel of the 320 MHz bandwidth is not punctured. If the value of the preamble puncturing information field B ranges from 1 to 15, the preamble puncturing information field B may be reserved for other purposes.

It should be understood that one or more STAs may be allocated with a full bandwidth; in other words, the full bandwidth is allocated to the one or more STAs. If a full bandwidth is allocated to one or more STAs, the STA is notified of an allocated resource by using the foregoing frequency domain segment structure of the EHT PPDU shown in FIG. 6, and the allocated resource needs to be indicated for each frequency domain segment, that is, the preamble puncturing information field A that is in the U-SIG field and that corresponds to each frequency domain segment needs to indicate [1 1 1 1]. It is clear that overheads are high. Therefore, in some embodiments, the preamble puncturing information field may indicate that a full-bandwidth (non-punctured) resource is allocated to a scheduled STA in a frequency domain segment. In this way, the STA may determine the allocated resource by using the preamble puncturing information field and a full bandwidth size indicated by the bandwidth field in the U-SIG field. Specifically, STAs to which full-bandwidth resources are allocated in the frequency domain segment may be determined through reading the user field in a user specific field in the EHT-SIG field following the U-SIG field. It should be noted that a scheduled STA herein is a STA to which a resource is allocated. For example, there are 10 STAs in a frequency domain segment, and all the 10 STAs read the U-SIG field. However, resources are allocated to eight of the 10 STAs. In this case, the eight STAs are scheduled STAs.

In a possible implementation, the preamble puncturing information field may be carried in the preamble puncturing information field A in the foregoing U-SIG field. It should be understood that the preamble puncturing information field A may occupy a plurality of bits, and may indicate a resource allocation status in one frequency domain segment. For example, for an 80 MHz frequency domain segment, the preamble puncturing information field A may occupy three bits. For a frequency domain segment greater than or equal to 160 MHz, the preamble puncturing information field A may occupy at least four bits. Table 4 shows content that may be indicated by the preamble puncturing information field A for the 80 MHz frequency domain segment.

TABLE 4

Meaning of the preamble puncturing information field A in the U-SIG field

| State | Content (resource allocation status) |
|---|---|
| 000(0) | [1 1 1 1] (indicating that the 80 MHz frequency domain segment is not punctured) |
| 001(1) | [x 1 1 1] (indicating that the first 20 MHz channel in the 80 MHz frequency domain segment is punctured) |
| 010(2) | [1 x 1 1] (indicating that the second 20 MHz channel in the 80 MHz frequency domain segment is punctured) |
| 011(3) | [1 1 x 1] (indicating that the third 20 MHz channel in the 80 MHz frequency domain segment is punctured) |
| 100(4) | [1 1 1 x] (indicating that the fourth 20 MHz channel in the 80 MHz frequency domain segment is punctured) |
| 101(5) | [x x 1 1] (indicating that the first and the second 20 MHz channels in the 80 MHz frequency domain segment are punctured) |
| 110(6) | [1 1 x x] (indicating that the third and fourth 20 MHz channels in the 80 MHz frequency domain segment are punctured) |
| 111(7) | Reserved (Reserved) |

It should be understood that a value of a 3-bit sequence carried in the preamble puncturing information field A in Table 4 represents a resource allocation status. It should be noted that Table 4 merely shows a correspondence between a value of the 3-bit sequence and a resource allocation status.

A specific correspondence between a value of the 3-bit sequence and a resource allocation status is not limited in this embodiment of this application. For example, when the 3-bit sequence is "111", it may indicate that the 80 MHz frequency domain segment is not punctured (namely, a state corresponding to [1 1 1 1]). When the 3-bit sequence is "110", it may indicate that the first 20 MHz channel in the 80 MHz frequency domain segment is punctured (namely, a state corresponding to [x 1 1 1]). Examples are not listed one by one herein.

The correspondence shown in Table 4 is used as an example. In this embodiment of this application, an entry of "full bandwidth (non-punctured)" may be added to Table 4. To be specific, the reserved entry in Table 4 represents that "a full-bandwidth (non-punctured) resource is allocated to a user in the frequency domain segment". For example, the full-bandwidth resource is 320 MHz. To be specific, the resource indicated by the bandwidth field in the U-SIG field is 320 MHz. If a full-bandwidth (non-punctured) resource unit is allocated to a STA in an 80 MHz channel, "111" may be carried by using the preamble puncturing information field A. For the STA, when the full-bandwidth resource is allocated to the STA by using the preamble puncturing information field A, the STA may determine, by reading the bandwidth field in the U-SIG field, that a non-punctured resource of 320 MHz is allocated. Specifically, STAs to which full-bandwidth resources are allocated in the frequency domain segment may be determined through reading the user field in the user specific field in the EHT-SIG field following the U-SIG field. In this solution, a full-bandwidth (non-punctured) resource can be indicated by using an indication of a preamble puncturing information field A for one frequency domain segment, and does not need to be indicated by using a preamble puncturing information field A corresponding to each frequency domain segment obtained through full bandwidth division, so that overheads can be reduced.

To further reduce signaling overheads, in some embodiments, a compression mode may be indicated in the U-SIG field or the EHT-SIG field. The compression mode is specific to a common field in the EHT-SIG field, in other words, a length of the common field is reduced.

For example, some fields in the common field are simplified, in other words, lengths occupied by the fields are reduced; or some fields in the common field are deleted. For example, a resource unit allocation subfield (RU Allocation subfield) in the common field may be simplified. For example, a quantity of resource unit allocation subfields is reduced, or the resource unit allocation subfield in the common field is omitted or deleted. If the common field includes a simplified resource unit allocation subfield (RU Allocation subfield) or includes no resource unit allocation subfield, a corresponding EHT PPDU is an EHT PPDU in the compression mode. In other words, the compression mode means that a format of the EHT PPDU is a format of a simplified version. For example, the RU Allocation subfield in the common field is simplified, or the RU Allocation subfield may even be omitted or deleted. A format of the EHT PPDU in a non-compression mode is a format of a non-simplified version. For example, the RU Allocation subfield in the common field is not simplified. For another example, if a part or all of user fields in the common field are deleted, the corresponding EHT PPDU is also the EHT PPDU in the compression mode. It should be understood that because the format of the EHT PPDU in the compression mode is simpler, overheads can be reduced.

In the compression mode, for example, the RU Allocation subfield is simplified or even deleted. Therefore, the preamble puncturing information field A and the preamble puncturing information field B need to indicate a resource allocated to a STA. It should be understood that, in OFDMA transmission, a resource unit allocated to a STA is indicated by using the RU Allocation subfield; in non-OFDMA transmission, a resource allocated to a STA may be indicated by using the preamble puncturing information field A and/or the preamble puncturing information field B. In addition, non-OFDMA transmission includes allocation of a full-bandwidth punctured non-OFDMA resource unit and allocation of a full-bandwidth non-punctured non-OFDMA resource unit. To distinguish between resource allocation in the foregoing several transmission modes, in this embodiment of this application, a plurality of compression modes may be defined, and a compression mode indication field is carried in the U-SIG field or the EHT-SIG field to indicate the compression mode.

For example, the following several modes may be defined in this embodiment of this application:
1. OFDMA transmission mode, where OFDMA transmission includes a resource indication of an RU Allocation subfield of a non-simplified version;
2. OFDMA transmission mode of a simplified version, where OFDMA transmission includes a resource indication of an RU Allocation subfield of a simplified version;
3. non-OFDMA punctured transmission mode, where in non-OFDMA transmission, an allocated resource is a full-bandwidth punctured resource unit; and
4. non-OFDMA non-punctured transmission mode, where in non-OFDMA transmission, an allocated resource is a full-bandwidth non-punctured resource unit.

It should be understood that the first transmission mode is a non-compression mode relative to the other three transmission modes. In other words, the other three transmission modes are compression modes relative to the first transmission mode. In some embodiments, the U-SIG field may indicate the compression mode, to be specific, the compression mode indication field is set in the U-SIG field. The compression mode indication field may occupy a plurality of bits to indicate the compression mode (including the non-compression mode and the compression mode). For example, the compression mode indication field may occupy two bits, and content indicated by the compression mode indication field may be shown in Table 5.

TABLE 5

| Meaning of the compression mode indication field in the U-SIG field | |
|---|---|
| State | Content (compression mode) |
| 00(0) | OFDMA transmission mode |
| 01(1) | Non-OFDMA punctured transmission mode |
| 10(2) | OFDMA transmission mode of a simplified version |
| 11(3) | Non-OFDMA non-punctured transmission mode |

It should be understood that in Table 5, one value of the compression mode indication field corresponds to one compression mode, and Table 5 is merely an example of a correspondence between a value and a compression mode. A specific correspondence between a value of the compression mode indication field and a compression mode is not limited in this embodiment of this application. For example, when the compression mode indication field carries "00", it may indicate that the compression mode is the non-OFDMA non-punctured transmission mode; or when the compression mode indication field carries "11", it may indicate that the compression mode is the OFDMA transmission mode. Examples are not listed one by one herein. It should be noted that, because a 1-bit space-time block coding (STBC) field in an HE-SIG-Afield in 802.11ax is meaningful only in non-MU-MIMO transmission, if a compression mode related to MU-MIMO exists, the STBC field may be reused. For example, the 1-bit STBC field may be further used to indicate two MU-MIMO compression modes, or used to participate in indicating a quantity of MU-MIMO users.

It should be understood that, for example, the entry of "full bandwidth (non-punctured)" is added to the foregoing Table 4. In this case, if a STA determines, from the compression mode indication field, that the compression mode is the non-OFDMA non-punctured transmission mode, the STA does not need to continue to read the preamble puncturing information field A, so that energy consumption can be reduced. The reserved entry in Table 4 represents that "a full-bandwidth (non-punctured) resource is allocated to a user in the frequency domain segment", and may also be considered as the non-OFDMA non-punctured transmission mode (one compression mode). Therefore, the reserved entry in Table 4 may also indicate the non-OFDMA non-punctured transmission mode or one compression mode. It should be understood that in this compression mode, the resource unit allocation subfield does not need to indicate a resource allocation status. Therefore, for the common field in the EHT-SIG field, a quantity of resource unit allocation subfields may be reduced or the resource unit allocation subfield may be deleted, to reduce signaling overheads as much as possible. It should be noted that the four modes shown in Table 5 are merely examples, and a type of the compression mode is not limited in this embodiment of this application. The reserved entry in Table 4 may indicate other compression modes in some other embodiments.

Similarly, the entry of "no resource unit is allocated" added (that is, the reserved entry reused) in Table 2 may also be considered as one transmission mode or one compression mode. In other words, that no resource unit is allocated to a scheduled user in a frequency domain segment may be defined as a transmission mode or a compression mode. When the reserved entry in Table 3 indicates the transmission mode or the compression mode, it may be determined that no resource unit is allocated to a served user in the frequency domain segment. It should be understood that, because no resource unit is allocated to a STA, the STA naturally does not need to read the user field in the EHT-SIG. In other words, the user field in the EHT-SIG field is unnecessary. Therefore, in this compression mode, the EHT-SIG field may include no user field, to reduce signaling overheads as much as possible. It should be noted that the four modes shown in Table 5 are merely examples, and a type of the compression mode is not limited in this embodiment of this application. The reserved entry in Table 2 may indicate other compression modes in some other embodiments.

As described above, for non-OFDMA transmission, in some embodiments, the preamble puncturing information field A in the U-SIG field in the EHT PPDU may indicate a resource allocation status. For example, for an 80 MHz bandwidth, the preamble puncturing information field A may occupy three bits, and indicated resource allocation statuses include [1 1 1 1], [x 1 1 1], [1 x 1 1], [1 1 x 1], and [1 1 1 x], namely, five statuses. For a 160 MHz bandwidth, the preamble puncturing information field A may occupy four bits, and indicated resource allocation statuses include [1 1 1 1 1 1 1 1], [x 1 1 1 1 1 1 1], [1 x 1 1 1 1 1 1], [1 1 x 1 1 1 1 1], [1 1 1 x 1 1 1 1], [1 1 1 1 x 1 1 1], [1 1 1 1 1 x 1 1], [1 1 1 1 1 1 x 1], [1 1 1 1 1 1 1 x], [x x 1 1 1 1 1 1], [1 1 x x 1 1 1 1], [1 1 1 1 x x 1 1], and [1 1 1 1 1 1 x x], namely, 13 statuses. In this case, a full-bandwidth punctured or full-bandwidth non-punctured indication in non-OFDMA transmission may be implemented by using the preamble puncturing information field A and the bandwidth field in the U-SIG field.

It should be understood that, if the frequency domain segment structure of the EHT PPDU shown in FIG. 6 is still used, for an 80 MHz frequency domain segment, the preamble puncturing information field A may indicate seven resource allocation statuses, namely, [1 1 1 1], [x 1 1 1], [1 x 1 1], [1 1 x 1], [1 1 1 x], [x x 1 1], and [1 1 x x]. In this case, a puncturing indication of an 80 MHz channel corresponding to each frequency domain segment in OFDMA transmission may be implemented by using the preamble puncturing information field A and the bandwidth field in the U-SIG field.

To reduce signaling overheads as much as possible, in this embodiment of this application, it may be defined as follows: The preamble puncturing information field A may be reused to indicate all puncturing statuses supported in non-OFDMA transmission, or indicate a puncturing status of an 80 MHz channel corresponding to each frequency domain segment in OFDMA transmission. In other words, the preamble puncturing information field A may indicate all puncturing statuses supported in non-OFDMA transmission, and may further indicate a puncturing status of an 80 MHz channel corresponding to each frequency domain segment in OFDMA transmission.

In a possible implementation, it may be defined as follows: When a field in the U-SIG field indicates that the EHT PPDU belongs to the non-OFDMA transmission mode, content indicated by the preamble puncturing information field A includes the foregoing five statuses, to be specific, an 80 MHz configuration indicates a punctured or non-punctured configuration in an 80 MHz channel (namely, a full bandwidth configuration) in non-OFDMA transmission. It may be defined as follows: When a field in the U-SIG field indicates that the EHT PPDU belongs to the OFDMA transmission mode, content indicated by the preamble puncturing information field A includes the foregoing seven statuses, to be specific, an 80 MHz configuration indicates the puncturing status of the 80 MHz channel corresponding to the frequency domain segment. In other words, if the bandwidth field indicates that a bandwidth is 80 MHz, when a field in the U-SIG field indicates that the EHT PPDU belongs to the non-OFDMA transmission mode, the preamble puncturing information field A indicates that an 80 MHz configuration indicates a punctured configuration or a non-punctured configuration in the 80 MHz channel in non-OFDMA transmission. If the bandwidth field indicates that a bandwidth is 80 MHz, and a field in the U-SIG field indicates that the EHT PPDU belongs to the OFDMA transmission mode, the preamble puncturing information field A indicates that an 80 MHz configuration indicates the puncturing status of the 80 MHz channel corresponding to the frequency domain segment. Therefore, for the 80 MHz channel, the preamble puncturing information field A has both a capability of indicating all the puncturing statuses supported in non-OFDMA transmission and a capability of indicating the puncturing status of the 80 MHz channel corresponding to the frequency domain segment in OFDMA transmission.

This solution may also be understood as being compatible with the foregoing puncturing indication manner 2 in non-OFDMA transmission, and can indicate puncturing information in 80 MHz OFDMA transmission. For ease of understanding, the following uses Table 6 as an example for description. Table 6 shows content indicated by the preamble puncturing information field A in the U-SIG. In Table 6, for example, a full bandwidth is 80 MHz and the preamble puncturing information field A occupies 3 bits.

TABLE 6

Meaning of the preamble puncturing information field A in the U-SIG field

| State | Content (resource allocation status) |
|---|---|
| 000(0) | [1 1 1 1] (indicating that the 80 MHz channel is not punctured) |
| 001(1) | [x 1 1 1] (indicating that the first 20 MHz channel in the 80 MHz channel is punctured) |
| 010(2) | [1 x 1 1] (indicating that the second 20 MHz channel in the 80 MHz channel is punctured) |
| 011(3) | [1 1 x 1] (indicating that the third 20 MHz channel in the 80 MHz channel is punctured) |
| 100(4) | [1 1 1 x] (indicating that the fourth 20 MHz channel in the 80 MHz channel is punctured) |
| 101(5) | [x x 1 1] (indicating that the first and the second 20 MHz channels in the 80 MHz channel are punctured) |
| 110(6) | [1 1 x x] (indicating that the third and the fourth 20 MHz channels in the 80 MHz channel are punctured) |
| 111(7) | Reserved (Reserved) |

It should be understood that, one value of the preamble puncturing information field A in Table 6 corresponds to one puncturing status, and Table 6 is merely an example of a correspondence between a value and a puncturing status. A specific correspondence between a value of the preamble puncturing information field A and a puncturing status is not limited in this embodiment of this application. For example, when the preamble puncturing information field A carries "111", it may indicate that the 80 MHz channel is not punctured (namely, a state corresponding to [1 1 1 1]). When the preamble puncturing information field A carries "110", it may indicate that the first 20 MHz channel in the 80 MHz channel is punctured (namely, a state corresponding to [x 1 1 1]). Examples are not listed one by one herein.

It should be understood that Table 6 is used as an example. If a field in the U-SIG field indicates that the EHT PPDU belongs to the non-OFDMA transmission mode, the preamble puncturing information field A indicates a punctured or non-punctured full bandwidth configuration in the 80 MHz channel in non-OFDMA transmission. In this case, for a station, if it is determined, based on the bandwidth field, that the full bandwidth is greater than or equal to 160 MHz, the STA only needs to read a puncturing status in the 80 MHz channel, and does not need to read bandwidth information other than the 80 MHz channel. If a field in the U-SIG field indicates that the EHT PPDU belongs to the OFDMA transmission mode, the preamble puncturing information field A indicates a puncturing status of a frequency domain segment corresponding to the 80 MHz channel in OFDMA transmission. It can be learned that for the 80 MHz full bandwidth, the preamble puncturing information field A has both a capability of indicating all puncturing statuses supported in non-OFDMA transmission and a capability of indicating the puncturing status of the 80 MHz channel corresponding to the frequency domain segment in OFDMA transmission.

It should be understood that this solution is compatible with the foregoing puncturing indication manner 2 in non-OFDMA transmission. Therefore, for a bandwidth greater than or equal to 160 MHz, the preamble puncturing information field A indicates a puncturing status in non-OFDMA transmission. In this case, it should be understood that the preamble puncturing information field A occupies at least four bits. When the preamble puncturing information field A occupies at least four bits, there are at least nine reserved statuses for a puncturing status indication of the 80 MHz frequency domain segment. In this case, the preamble puncturing information field A may be reused to indicate the compression mode. In this way, the compression mode indication field does not need to be additionally set in the U-SIG field or the EHT-SIG field, so that signaling overheads are reduced as much as possible.

For ease of understanding, the following uses Table 7 as an example for description. Table 7 shows content indicated by the preamble puncturing information field A in the U-SIG field. In FIG. 7, for example, a full bandwidth is greater than or equal to 160 MHz, the preamble puncturing information field A occupies 4 bits, and a compression mode, for example, a compression mode 1 is used. It should be understood that there are nine reserved statuses for a puncturing status indication of an 80 MHz frequency domain segment. Table 7 also shows puncturing statuses of the 80 MHz frequency domain segment.

TABLE 7

Meaning of the preamble puncturing information field A in the U-SIG field

| State | Content (resource allocation status) |
|---|---|
| 0000(0) | [1 1 1 1] (indicating that the 80 MHz frequency domain segment is not punctured) |
| 0001(1) | [x 1 1 1] (indicating that the first 20 MHz channel in the 80 MHz frequency domain segment is punctured) |
| 0010(2) | [1 x 1 1] (indicating that the second 20 MHz channel in the 80 MHz frequency domain segment is punctured) |
| 0011(3) | [1 1 x 1] (indicating that the third 20 MHz channel in the 80 MHz frequency domain segment is punctured) |
| 0100(4) | [1 1 1 x] (indicating that the fourth 20 MHz channel in the 80 MHz frequency domain segment is punctured) |
| 0101(5) | [x x 1 1] (indicating that the first and the second 20 MHz channels in the 80 MHz frequency domain segment are punctured) |
| 0110(6) | [1 1 x x] (indicating that the third and the fourth 20 MHz channels in the 80 MHz frequency domain segment are punctured) |
| 0111(7) | Reserved (Reserved) |
| 1000(8) | [1 1 1 1] (indicating that the compression mode 1 is used, and the 80 MHz frequency domain segment is not punctured) |
| 1001(9) | [x 1 1 1] (indicating that the compression mode 1 is used, and the first 20 MHz channel in the 80 MHz frequency domain segment is punctured) |
| 1010(10) | [1 x 1 1] (indicating that the compression mode 1 is used, and the second 20 MHz channel in the 80 MHz frequency domain segment is punctured) |
| 1011(11) | [1 1 x 1] (indicating that the compression mode 1 is used, and the third 20 MHz channel in the 80 MHz frequency domain segment is punctured) |
| 1100(12) | [1 1 1 x] (indicating that the compression mode 1 is used, and the fourth 20 MHz channel in the 80 MHz frequency domain segment is punctured) |
| 1101(13) | [x x 1 1] (indicating that the compression mode 1 is used, and the first and the second 20 MHz channels in the 80 MHz frequency domain segment are punctured) |
| 1110(14) | [1 1 x x] (indicating that the compression mode 1 is used, and the third and the fourth 20 MHz channels in the 80 MHz frequency domain segment are punctured) |
| 1111(15) | Reserved (Reserved) |

It should be understood that, one value of the preamble puncturing information field A in Table 7 corresponds to one puncturing status, and Table 7 is merely an example of a correspondence between a value and a puncturing status. A specific correspondence between a value of the preamble puncturing information field A and a puncturing status is not limited in this embodiment of this application. For example, when the preamble puncturing information field A carries "1000", it may indicate that the first 20 MHz channel in the 80 MHz frequency domain segment is punctured (namely, a state corresponding to [x 1 1 1]). When the preamble puncturing information field A carries "0001", it may indicate that the compression mode 1 is used, and the 80 MHz frequency domain segment is not punctured (namely, a state corresponding to [1 1 1 1]). Examples are not listed one by one herein.

Table 7 is used as an example. It can be learned from Table 7 that in this embodiment of this application, the preamble puncturing information field A has both a capability of indicating all puncturing statuses supported in non-OFDMA transmission and a capability of indicating a puncturing status of an 80 MHz channel corresponding to a frequency domain segment in OFDMA transmission. In addition, the preamble puncturing information field further indicates a compression transmission mode in OFDMA transmission.

It can be learned from Table 6 and Table 7 that in this embodiment of this application, the preamble puncturing information field A has both a capability of indicating all puncturing statuses supported in non-OFDMA transmission and a capability of indicating a puncturing status of an 80 MHz channel corresponding to a frequency domain segment in OFDMA transmission, for an 80 MHz full bandwidth. In this case, the preamble puncturing information field A may occupy at least three bits. To be compatible with a puncturing indication in non-OFDMA transmission greater than or equal to 160 MHz, the preamble puncturing information field A may occupy at least four bits. Therefore, in some embodiments, a puncturing indication in OFDMA transmission may alternatively be separated from a puncturing indication in non-OFDMA transmission. In other words, the puncturing indication in non-OFDMA transmission is still used, and that the preamble puncturing information field A occupies at least M bits is defined, where M is greater than or equal to 4. The puncturing indication in OFDMA transmission is indicated by using three of the M bits. The M bits except the three bits, namely, M-3 bits, may indicate a compression mode or a non-compression mode in OFDMA transmission.

It should be understood that, in this case, it needs to be distinguished whether the preamble puncturing information field A indicates OFDMA transmission or non-OFDMA transmission. In this embodiment of this application, 1-bit indication information may additionally indicate whether the preamble puncturing information field A indicates OFDMA transmission or non-OFDMA transmission. It should be understood that the 1-bit indication information is carried in a PPDU.

For a STA, when receiving the PPDU from an AP, the STA may first determine, by using the 1-bit indication information, whether the M-bit preamble puncturing information field A indicates OFDMA transmission or non-OFDMA transmission. If the M-bit preamble puncturing information field A indicates non-OFDMA transmission, the STA may determine a puncturing status of an allocated bandwidth. If the M-bit preamble puncturing information field A indicates OFDMA transmission, the STA may determine, based on three of the M bits, a puncturing status of a frequency domain segment corresponding to an 80 MHz channel, and determine, based on the M-3 bits, a compression mode or a non-compression mode in OFDMA transmission.

According to the resource indication method provided in this embodiment of this application, in the method, a new U-SIG field and a new EHT-SIG field are designed, a field in the U-SIG field and/or the EHT-SIG field may be reused to indicate a plurality of consecutive or inconsecutive RUs allocated to a user. In comparison with using a resource unit allocation subfield in 802.11ax to indicate an allocated resource to a user, this can further reduce signaling overheads.

It should be noted that, in the resource indication method in this specification, the EHT PPDU segment structure is used to implement resource indication. In other words, the resource indication method in this specification is applicable to a scenario in which a full bandwidth is divided into one or more frequency domain segments. It should be understood that the resource indication method may further be applicable to a not-segmented scenario. For example, if a bandwidth of a channel for transmitting a PPDU is 320 MHz, the first 80 MHz channel (that is, a primary 80 MHz channel) in the 320 MHz bandwidth may be indicated first, and then the entire 320 MHz bandwidth is indicated. However, the resource indication method in this specification, namely, an indication of an 80 MHz frequency domain segment, may still indicate the primary 80 MHz channel.

In the foregoing embodiments provided in this application, the method provided in embodiments of this application is separately described from perspectives of an AP, a STA, and interaction between the AP and the STA. To implement functions in the foregoing method provided in embodiments of this application, an AP and a STA each may include a hardware structure and/or a software module, and implement the foregoing functions in a form of the hardware structure, the software module, or a combination of the hardware structure and the software module.

With reference to the accompanying drawings, the following describes communication apparatuses configured to implement the foregoing method in embodiments of this application. Therefore, the foregoing content may be used in subsequent embodiments, and repeated content is not described again.

Figure 9:
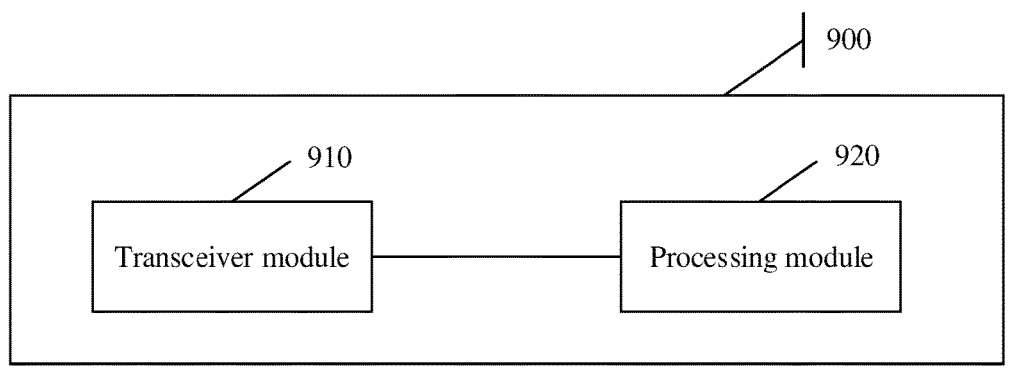
FIG. 9 is a schematic diagram of a structure of a communication apparatus according to an embodiment of this application.

FIG. 9 is a schematic diagram of a structure of a communication apparatus 900. The communication apparatus 900 may correspondingly implement functions or steps implemented by a transmit end, for example, an AP, or a receive end, for example, a STA, in the foregoing method embodiments. The communication apparatus may include a transceiver module 910 and a processing module 920. Optionally, the communication apparatus may further include a storage unit. The storage unit may be configured to store instructions (code or a program) and/or data. The transceiver module 910 and the processing module 920 may be coupled to the storage unit. For example, the processing module 920 may read the instructions (the code or the program) and/or the data in the storage unit, to implement a corresponding method. The foregoing units may be independently disposed, or may be partially or completely integrated. For example, the transceiver module 910 may be integrated by a sending unit and a receiving unit.

In some possible implementations, the communication apparatus 900 can correspondingly implement behaviors and functions of the STA in the foregoing method embodiments. For example, the communication apparatus 900 may be a STA, or may be a component (for example, a chip or a circuit) used in the STA. The transceiver module 910 may be configured to perform all receiving or sending operations performed by the STA in the embodiment shown in FIG. 8, for example, S802 in the embodiment shown in FIG. 8, and/or configured to support another process of the technology described in this specification. The processing module 920 is configured to perform all operations performed by the STA in the embodiment shown in FIG. 8 except the sending and receiving operations, for example, S803 in the embodiment shown in FIG. 8, and/or configured to support another process of the technology described in this specification.

In a possible implementation, the transceiver module 910 is configured to receive a PPDU from an access point, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment; and the processing module 920 is configured to determine an allocated resource based on the preamble puncturing indication information.

In an optional implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In an optional implementation, the preamble puncturing indication information is carried in a first preamble puncturing information field, and the first preamble puncturing information field is located in a U-SIG field.

In a possible implementation, the transceiver module 910 is configured to receive a PPDU from an access point, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment; and the processing module 920 is configured to determine an allocated resource based on the preamble puncturing indication information.

In an optional implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In an optional implementation, the preamble puncturing indication information is carried in a first preamble puncturing information field, and the first preamble puncturing information field is located in a U-SIG field.

In a possible implementation, the transceiver module 910 is configured to receive a PPDU from an access point, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment; and the processing module 920 is configured to determine an allocated resource based on the preamble puncturing indication information and a bandwidth field.

In a possible implementation, the transceiver module 910 is configured to receive a PPDU from an access point, where the PPDU includes preamble puncturing indication information transmitted in a first frequency domain segment, the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, and the second preamble puncturing information field indicates a puncturing status of a remaining frequency domain segment in a first bandwidth other than the first frequency domain segment; and the processing module 920 is configured to determine an allocated resource based on the preamble puncturing indication information and a bandwidth field.

In some possible implementations, the communication apparatus 900 can correspondingly implement behaviors and functions of the STA in the foregoing method embodiments. For example, the communication apparatus 900 may be an AP, or may be a component (for example, a chip or a circuit) used in the AP. The transceiver module 910 may be configured to perform all receiving or sending operations performed by the AP in the embodiment shown in FIG. 8, for example, S802 in the embodiment shown in FIG. 8, and/or configured to support another process of the technology described in this specification. The processing module 920 is configured to perform all operations performed by the AP in the embodiment shown in FIG. 8 except the sending and receiving operations, for example, S801 in the embodiment shown in FIG. 8, and/or configured to support another process of the technology described in this specification.

For example, the processing module 920 is configured to generate a PPDU, where the PPDU includes preamble puncturing indication information transmitted in a first frequency domain segment, the preamble puncturing indication information indicates that a first bandwidth is allocated to a scheduled user in the first frequency domain segment, the first bandwidth is a channel bandwidth for transmitting the PPDU, and the first bandwidth includes the first frequency domain segment; and the transceiver module 910 is configured to send the PPDU.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a U-SIG field.

For another example, the processing module 920 is configured to generate a PPDU, where the PPDU includes preamble puncturing indication information transmitted in a first frequency domain segment, the preamble puncturing indication information indicates that no resource unit is allocated to a user in the first frequency domain segment, and a channel bandwidth for transmitting the PPDU includes the first frequency domain segment; and the transceiver module 910 is configured to send the PPDU.

In a possible implementation, the preamble puncturing indication information further indicates a compression mode, where a length of the PPDU in the compression mode is less than a length of the PPDU in a non-compression mode, and the PPDU in the compression mode is a PPDU in which a user field or a resource unit allocation subfield is omitted; or the PPDU in the compression mode is a PPDU in which a resource unit allocation subfield is simplified.

In a possible implementation, the preamble puncturing indication information is carried in a first preamble puncturing information field, and the first preamble puncturing information field is located in a U-SIG field.

For example, the transceiver module 910 is configured to receive a PPDU from an access point, where the PPDU includes preamble puncturing indication information transmitted in a first frequency domain segment; and when the PPDU is in an OFMDA transmission mode, the preamble puncturing indication information indicates a punctured configuration or a non-punctured configuration of a first bandwidth whose bandwidth is 80 MHz; or when the PPDU is in a non-OFDMA transmission mode, the preamble puncturing indication information indicates a puncturing status of an 80 MHz channel corresponding to the first frequency domain segment; and
  the processing module 920 is configured to determine an allocated resource based on the preamble puncturing indication information and a bandwidth field.

For example, the transceiver module 910 is configured to receive a PPDU from an access point, where the PPDU includes preamble puncturing indication information transmitted in a first frequency domain segment, the preamble puncturing indication information is carried in a first preamble puncturing information field and a second preamble puncturing information field, the first preamble puncturing information field is located in a U-SIG field, the second preamble puncturing information field is located in an EHT-SIG field, the first preamble puncturing information field indicates a puncturing status of the first frequency domain segment or indicates that a full bandwidth is not punctured, the second preamble puncturing information field indicates a puncturing status of a remaining frequency domain segment in a first bandwidth other than the first frequency domain segment, the first bandwidth is a channel bandwidth for transmitting the PPDU, and the first bandwidth includes the first frequency domain segment; and
  the processing module 920 is configured to determine an allocated resource based on the preamble puncturing indication information.

Figure 10:
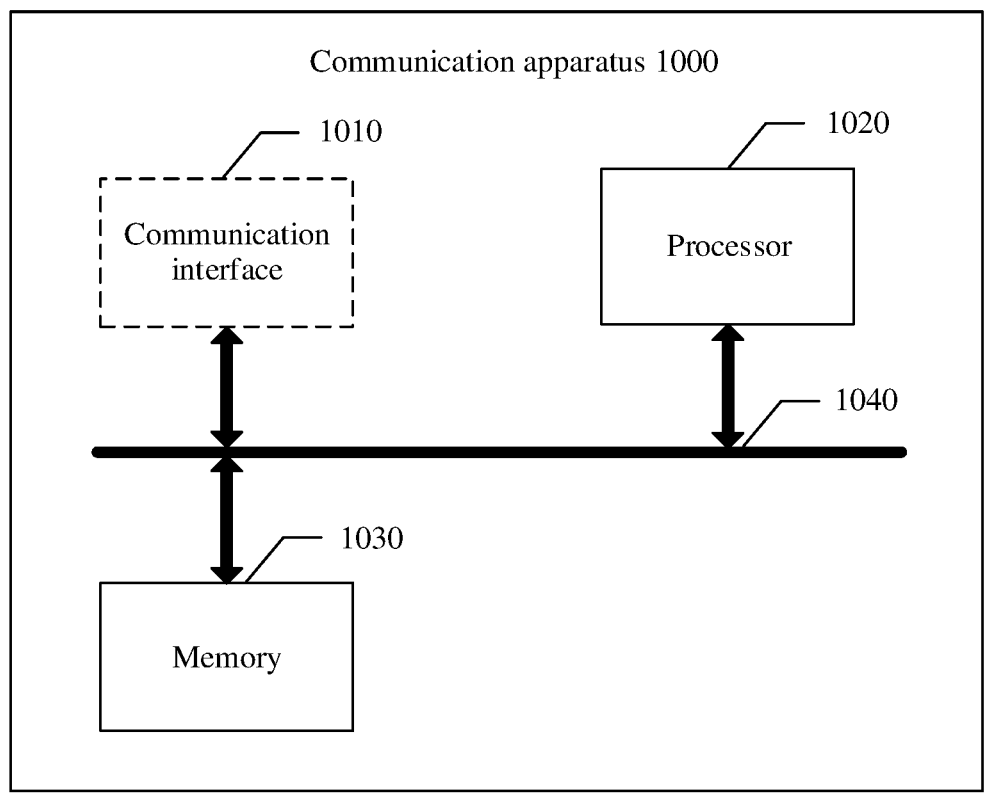
FIG. 10 is a schematic diagram of another structure of a communication apparatus according to an embodiment of this application.

FIG. 10 shows a communication apparatus 1000 according to an embodiment of this application. The communication apparatus 1000 may be a STA, and can implement a function of the STA in the method provided in embodiments of this application. Alternatively, the communication apparatus 1000 may be an AP, and can implement a function of the AP in the method provided in embodiments of this application. Alternatively, the communication apparatus 1000 may be an apparatus that can support a STA in implementing a corresponding function in the method provided in embodiments of this application. Alternatively, the communication apparatus 1000 may be an apparatus that can support an AP in implementing a corresponding function in the method provided in embodiments of this application. The communication apparatus 1000 may be a chip system. In embodiments of this application, the chip system may include a chip; or may include a chip and another discrete component.

In some embodiments, the communication apparatus 1000 may include a communication interface 1010, configured to communicate with another device through a transmission medium, so that an apparatus used in the communication apparatus 1000 can communicate with the another device. For example, when the communication apparatus is a STA, the another device is an AP; or when the communication apparatus is an AP, the another device is a STA. The communication interface 1010 may be specifically a transceiver. In terms of hardware implementation, the communication interface 1010 may be a transceiver, and the transceiver is integrated into the communication apparatus 1000 to form the communication interface 1010.

The communication apparatus 1000 further includes at least one processor 1020. The processor 1020 may send and receive data through the communication interface 1010, to implement the function of the STA or the AP or support the communication apparatus 1000 in implementing the function of the STA or the AP in the method provided in embodiments of this application. For example, the communication apparatus 1000 can correspondingly implement behaviors and the functions of the STA in the foregoing method embodiments.

The communication interface 1010 may be configured to perform all receiving or sending operations performed by the STA in the embodiment shown in FIG. 8, for example, S802 in the embodiment shown in FIG. 8, and/or configured to support another process of the technology described in this specification. The at least one processor 1020 is configured to perform all operations performed by the STA in the embodiment shown in FIG. 8 except the sending and receiving operations, for example, S803 in the embodiment shown in FIG. 8, and/or configured to support another process of the technology described in this specification.

For example, the communication apparatus 1000 can correspondingly implement behaviors and the functions of the AP in the foregoing method embodiments. The communication interface 1010 may be configured to perform all receiving or sending operations performed by the AP in the embodiment shown in FIG. 8, for example, S802 in the embodiment shown in FIG. 8, and/or configured to support another process of the technology described in this specification. The at least one processor 1020 is configured to perform all operations performed by the AP in the embodiment shown in FIG. 8 except the sending and receiving operations, for example, S801 in the embodiment shown in FIG. 8, and/or configured to support another process of the technology described in this specification.

In some other embodiments, the communication apparatus 1000 may further include at least one memory 1030, configured to store program instructions and/or data. The memory 1030 is coupled to the processor 1020. The coupling in this embodiment of this application is indirect coupling or a communication connection between apparatuses, units, or modules, may be in an electrical form, a mechanical form, or another form, and is used for information exchange between the apparatuses, the units, or the modules. The processor 1020 may operate in collaboration with the memory 1030. The processor 1020 may execute the program instructions and/or the data stored in the memory 1030, so that the communication apparatus 1000 implements a corresponding method. The at least one memory may be included in the processor.

A specific connection medium between the communication interface 1010, the processor 1020, and the memory 1030 is not limited in this embodiment of this application. In this embodiment of this application, in FIG. 10, the memory 1030, the processor 1020, and the communication interface 1010 are connected through a bus 1040. The bus is represented by a bold line in FIG. 10. A connection manner between other components is merely an example for description, and is not limited thereto. The bus may be classified into an address bus, a data bus, a control bus, and the like. For ease of representation, only one thick line is for representing the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed and completed by a hardware processor, or may be performed and completed by a combination of hardware and a software module in the processor.

In this embodiment of this application, the memory 1030 may be a non-volatile memory, for example, a hard disk drive (HDD) or a solid-state drive (SSD); or may be a volatile memory (volatile memory), for example, a random access memory (RAM). The memory is any other medium that can carry or store expected program code in a form of an instruction or a data structure and can be accessed by a computer, but is not limited thereto. The memory in this embodiment of this application may alternatively be a circuit or any other apparatus that can implement a storage function, and is configured to store program instructions and/or data.

It should be noted that the communication apparatus in the foregoing embodiment may be a STA, an AP, or a circuit; or may be a chip used in a STA or an AP, or another combined device, component, or the like that has a function of the foregoing STA or AP. When the communication apparatus is the STA or the AP, the transceiver module 910 may be a transceiver, and may include an antenna, a radio frequency circuit, and the like. The processing module may be a processor, for example, a central processing unit (CPU). When the communication apparatus is a component having the function of the foregoing STA or AP, the transceiver module 910 may be a radio frequency unit, and the processing module may be a processor. When the communication apparatus is a chip system, the transceiver module 910 may be an input/output interface of the chip system, and the processing module may be a processor of the chip system.

In a possible product form, the AP and the STA in embodiments of this application may alternatively be implemented by using one or more FPGAs (field programmable gate arrays), PLDs (programmable logic devices), controllers, state machines, gate logic, discrete hardware components, any other suitable circuits, or any combination of circuits that can perform various functions described in this application.

It should be understood that the APs in the foregoing product forms have any function of the AP in the foregoing method embodiments, and details are not described herein again; and the STAs in the foregoing product forms have any function of the STA in the foregoing method embodiments, and details are not described herein again.

An embodiment of this application further provides a communication system. Specifically, the communication system includes a STA and an AP, or may include more APs and access network devices. For example, the communication system includes a STA and an AP that are configured to implement related functions in FIG. 6 or FIG. 9.

The AP is configured to implement a function of a network part related to FIG. 8. The STA is configured to implement a function of the STA related to FIG. 8. For example, the STA may perform, for example, S802 and S803 in the embodiment shown in FIG. 8, and the AP may perform S801 and S802 in the embodiment shown in FIG. 8.

An embodiment of this application further provides a computer-readable storage medium, including instructions. When the instructions are run on a computer, the computer is enabled to perform the method performed by the AP or the STA in FIG. 8.

An embodiment of this application further provides a computer program product, including computer program code. When the computer program code runs on a computer, the computer is enabled to perform the method performed by the AP or the STA in FIG. 8.

An embodiment of this application provides a chip system. The chip system includes a processor, may further include a memory, and is configured to implement a function of the AP or the STA in the foregoing method. The chip system may include a chip; or may include a chip and another discrete component.

An embodiment of this application further provides a communication apparatus, including a processor and an interface. The processor is configured to perform the resource indication method in any one of the foregoing method embodiments.

It should be understood that the communication apparatus may be a chip. The processor may be implemented by using hardware, or may be implemented by using software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

The method provided in embodiments of this application may be completely or partially implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of the present invention are generated. The computer may be a general-purpose computer, a special-purpose computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of protection defined by the claims of this application and their equivalent technologies.

The invention claimed is:

1. A resource indication method, comprising:
   generating a physical layer protocol data unit (PPDU), the PPDU comprising a universal signal (U-SIG) field including a preamble puncturing information field, wherein a field in the U-SIG field indicates whether the PPDU is in an orthogonal frequency division multiple access (OFDMA) transmission mode or a non-orthogonal frequency division multiple access (non-OFDMA) transmission mode, and wherein:
   when the field in the U-SIG field indicates that the PPDU is in the non-OFDMA transmission mode, the preamble puncturing information field indicates a puncturing status of an entire bandwidth corresponding to the PPDU;
   when the field in the U-SIG field indicates that the PPDU is in the OFDMA transmission mode, the preamble puncturing information field indicates a puncturing status of 80 MHz corresponding to a frequency domain segment; and
   sending the PPDU.

2. The method according to claim 1, wherein the U-SIG field comprises a bandwidth field.

3. The method according to claim 2, wherein the PPDU is in non-OFDMA transmission mode, and the bandwidth field indicates that the entire bandwidth corresponding to the PPDU is an 80 MHz bandwidth, the preamble puncturing information field indicates that no puncturing is performed or that only one 20 MHz bandwidth of the 80 MHz bandwidth is punctured.

4. The method according to claim 3, wherein the 80 MHz bandwidth sequentially comprises a first 20 MHz, a second 20 MHz, a third 20 MHz, and a fourth 20 MHz in ascending order of frequencies, and a puncturing status corresponding to the 80 MHz bandwidth is one of the following puncturing statuses: [1 1 1 1], [x 1 1 1], [1 x 1 1], [1 1 x 1], and [1 1 1 x], wherein 1 indicates a non-punctured state, and x indicates a punctured state, and the PPDU is not transmitted on the channel corresponding to a punctured state.

5. The method according to claim 2, wherein the PPDU is in non-OFDMA transmission mode, and the bandwidth field indicates that the entire bandwidth corresponding to the PPDU is a 160 MHz bandwidth, the preamble puncturing information field indicates that no puncturing is performed or that one 20 MHz or 40 MHz bandwidth of the 160 MHz bandwidth is punctured.

6. The method according to claim 5, wherein the 160 MHz sequentially comprises a first 20 MHz, a second 20 MHz, a third 20 MHz, a fourth 20 MHz, a fifth 20 MHz, a sixth 20 MHz, a seventh 20 MHz, and an eighth 20 MHz, wherein
   when no puncturing is performed, the puncturing status of the 160 MHz bandwidth is [1 1 1 1 1 1 1 1]; or
   when 20 MHz bandwidth is punctured, the puncturing status of the 160 MHz bandwidth is one of the following puncturing status: [x 1 1 1 1 1 1 1], [1 x 1 1 1 1 1 1], [1 1 x 1 1 1 1 1], [1 1 1 x 1 1 1 1], [1 1 1 1 x 1 1 1], [1 1 1 1 1 x 1 1], [1 1 1 1 1 1 x 1] and [1 1 1 1 1 1 1 x]; or
   when 40 MHz is punctured, the puncturing status of the 160 MHz bandwidth is one of the following puncturing status: [x x 1 1 1 1 1 1], [1 1 x x 1 1 1 1], [1 1 1 1 x x 1 1] and [1 1 1 1 1 1 x x];
   wherein 1 indicates a non-punctured state, and x indicates a punctured state, and the PPDU is not transmitted on the channel corresponding to a punctured state.

7. The method according to claim 2, wherein the PPDU is in non-OFDMA transmission mode, and the bandwidth field indicates that the entire bandwidth corresponding to the PPDU is a 320 MHz bandwidth, the preamble puncturing information field indicates that no puncturing is performed or that one 80 MHz or 120 MHz bandwidth of the 320 MHz bandwidth is punctured.

8. The method according to claim 2, wherein the PPDU is in OFDMA transmission mode, and the bandwidth indication field indicates that the bandwidth of the PPDU is 80 MHz or 160 MHz or 320 MHz, which corresponds to one or more 80 MHz bandwidth frequency domain segments, the preamble puncturing information field indicating a puncturing status of a corresponding 80 MHz bandwidth frequency domain segment of the one or more 80 MHz bandwidth frequency domain segments, and wherein the puncturing status of the corresponding 80 MHz bandwidth frequency domain segment includes one of the following puncturing statuses: [1 1 1 1], [x 1 1 1], [1 x 1 1], [1 1 x 1], [1 1 1 x], [x x 1 1], and [1 1 x x], wherein 1 indicates a non-punctured state, and x indicates a punctured state, each value corresponds to a respective 20 MHz bandwidth in the corresponding 80 MHz frequency domain segment and the PPDU is not transmitted on a 20 MHz bandwidth corresponding to a punctured state.

9. A communication apparatus, wherein the apparatus comprises a processor, a memory, and a communication interface; and wherein the memory is coupled to the processor and stores program instructions; and the processor is configured to execute the program instructions stored in the memory, so that the communication apparatus implements the following method:
   generating a physical layer protocol data unit (PPDU), wherein the PPDU comprises a universal signal (U-SIG) field, a field in the U-SIG field indicates whether the PPDU is in an orthogonal frequency division multiple access (OFDMA) transmission mode or a non-orthogonal frequency division multiple access (non-OFDMA) transmission mode, and the U-SIG field comprises a preamble puncturing information field; wherein:
   when the field in the U-SIG field indicates that the PPDU is in the non-OFDMA transmission mode, the preamble puncturing information field indicates a puncturing status of an entire bandwidth corresponding to the PPDU;
   when the field in the U-SIG field indicates that the PPDU is in the OFDMA transmission mode, the preamble puncturing information field indicates a puncturing status of 80 MHz corresponding to a frequency domain segment; and sending the PPDU.

10. The apparatus according to claim 9, wherein the U-SIG field comprises a bandwidth field.

11. The apparatus according to claim 10, wherein the PPDU is in non-OFDMA transmission mode, the bandwidth field indicates that the entire bandwidth corresponding to the PPDU is an 80 MHz bandwidth, and the preamble puncturing information field indicates that no puncturing is performed or that only one 20 MHz bandwidth of the 80 MHz bandwidth is punctured.

12. The apparatus according to claim 11, wherein the 80 MHz bandwidth sequentially comprises a first 20 MHz, a second 20 MHz, a third 20 MHz, and a fourth 20 MHz in ascending order of frequencies, and a puncturing status corresponding to the 80 MHz bandwidth is one of the following puncturing statuses: [1 1 1 1], [x 1 1 1], [1 x 1 1], [1 1 x 1], and [1 1 1 x], wherein 1 indicates a non-punctured state, and x indicates a punctured state, and the communication interface is configured to not transmit the PPDU on the channel corresponding to a punctured state.

13. The apparatus according to claim 10, wherein the PPDU is in non-OFDMA transmission mode, the bandwidth field indicates that the entire bandwidth corresponding to the PPDU is a 160 MHz bandwidth, and the preamble puncturing information field indicates that no puncturing is performed or that one 20 MHz or 40 MHz bandwidth of the 160 MHz bandwidth is punctured.

14. The apparatus according to claim 13, wherein the 160 MHz sequentially comprises a first 20 MHz, a second 20 MHz, a third 20 MHz, a fourth 20 MHz, a fifth 20 MHz, a sixth 20 MHz, a seventh 20 MHz, and an eighth 20 MHz, wherein the preamble puncturing information field indicates that no puncturing is performed, and the puncturing status of the 160 MHz bandwidth is [1 1 1 1 1 1 1 1 1 1 1]; or the preamble puncturing information field indicates that 20 MHz bandwidth is punctured, and the puncturing status of the 160 MHz bandwidth is one of the following puncturing status: [x 1 1 1111 1], [1 x 1 1 1 1 1 1], [1 1 x 1 1 1 1 1], [1 1 1 x 1 1 11], [1 1 1 1 x 1 1 1], [1 1 1 1 1 x 1 1], [1 1 1 1 1 1 x 1] and [1 1 1 1 1 1 1 x]; or the preamble puncturing information field indicates that 40 MHz is punctured, and the puncturing status of the 160 MHz bandwidth is one of the following puncturing status: [x x 1 1 1 1 1 1], [1 1 x x 1 1 1 1], [1 1 1 1 x x 1 1] and [1 1 1 1 1 1 x x];

wherein 1 indicates a non-punctured state, and x indicates a punctured state, and the communication interface is configured to not transmit the PPDU on the channel corresponding to a punctured state.

15. The apparatus according to claim 10, wherein the PPDU is in non-OFDMA transmission mode, the bandwidth field indicates that the entire bandwidth corresponding to the PPDU is a 320 MHz bandwidth, and the preamble puncturing information field indicates that no puncturing is performed or that one 80 MHz or 120 MHz bandwidth of the 320 MHz bandwidth is punctured.

16. The apparatus according to claim 10, wherein the PPDU is in OFDMA transmission mode, and the bandwidth indication field indicates that the bandwidth of the PPDU is 80 MHz or 160 MHz or 320 MHz, which corresponds to one or more 80 MHz bandwidth frequency domain segments, the preamble puncturing information field indicating a puncturing status of a corresponding 80 MHz bandwidth frequency domain segment of the one or more 80 MHz bandwidth frequency domain segments, and wherein the puncturing status of the corresponding 80 MHz bandwidth frequency domain segment includes one of the following puncturing statuses: [1 1 1 1], [x 1 1 1], [1 x 1 1], [1 1 x 1], [1 1 1 x], [x x 1 1], and [1 1 x x], wherein 1 indicates a non-punctured state, and x indicates a punctured state, each value corresponds to a respective 20 MHz bandwidth in the corresponding 80 MHz frequency domain fragment segment and the communication interface is configured to not transmit the PPDU on a 20 MHz bandwidth corresponding to a punctured state.

17. A non-transitory computer-readable storage medium, wherein the non-transitory computer-readable storage medium stores a computer program, the computer program comprises program instructions; and when the program instructions are executed by a computer, the computer is enabled to perform the following steps:

generating a physical layer protocol data unit (PPDU), wherein the PPDU comprises a universal signal (U-SIG) field, and the U-SIG field comprises a preamble puncturing information field, wherein a field in the U-SIG field indicates whether the PPDU is in an orthogonal frequency division multiple access (OFDMA) transmission mode or a non-orthogonal frequency division multiple access (non-OFDMA) transmission mode, and wherein:

when the field in the U-SIG field indicates that the PPDU is in the non-OFDMA transmission mode, the preamble puncturing information field indicates a puncturing status of an entire bandwidth corresponding to the PPDU;

when the field in the U-SIG field indicates that the PPDU is in the OFDMA transmission mode, the preamble puncturing information field indicates a puncturing status of 80 MHz corresponding to a frequency domain segment; and sending the PPDU.

18. The non-transitory computer-readable storage medium according to claim 17, wherein the PPDU is in non-OFDMA transmission mode, the U-SIG field comprises a bandwidth field, and the bandwidth field indicates that the entire bandwidth corresponding to the PPDU is an 80 MHz bandwidth, the preamble puncturing information field indicates that no puncturing is performed or that only one 20 MHz bandwidth of the 80 MHz bandwidth is punctured.

19. The non-transitory computer-readable storage medium according to claim 18, wherein the 80 MHz bandwidth sequentially comprises a first 20 MHz, a second 20 MHz, a third 20 MHz, and a fourth 20 MHz in ascending order of frequencies, and a puncturing status corresponding to the 80 MHz bandwidth is one of the following puncturing statuses: [1 1 1 1], [x 1 1 1], [1 x 1 1], [1 1 x 1], and [1 1 1 x], wherein 1 indicates a non-punctured state, and x indicates a punctured state, and the communication interface is configured to not transmit the PPDU on the channel corresponding to a punctured state.

20. The non-transitory computer-readable storage medium according to claim 17, wherein the PPDU is in non-OFDMA transmission mode, and the bandwidth field indicates that the entire bandwidth corresponding to the PPDU is a 160 MHz bandwidth, the preamble puncturing information field indicates that no puncturing is performed or that one 20 MHz or 40 MHz bandwidth of the 160 MHz bandwidth is punctured.

21. The non-transitory computer-readable storage medium according to claim 20, wherein the 160 MHz sequentially comprises a first 20 MHz, a second 20 MHz, a third 20 MHz, a fourth 20 MHz, a fifth 20 MHz, a sixth 20 MHz, a seventh 20 MHz, and an eighth 20 MHz, wherein
the preamble puncturing information field indicates that no puncturing is performed, and the puncturing status of the 160 MHz bandwidth is [1 1 1 1 1 1 1 1 1 1]; or
the preamble puncturing information field indicates that 20 MHz bandwidth is punctured, and the puncturing status of the 160 MHz bandwidth is one of the following puncturing status: [x 1 1 1 1 1 1 1], [1 x 1 1 1 1 1 1], [1 1 x 1 1 1 1 1], [1 1 1 x 1 1 1 1], [1 1 1 1 x 1 1 1], [1 1 1 1 1 x 1 1], [1 1 1 1 1 1 x 1] and [1 1 1 1 1 1 1 x]; or
the preamble puncturing information field indicates that 40 MHz is punctured, and the puncturing status of the 160 MHz bandwidth is one of the following puncturing status: [x x 1 1 1 1 1 1], [1 1 x x 1 1 1 1], [1 1 1 1 x x 1 1] and [1 1 1 1 1 1 x x];
wherein 1 indicates a non-punctured state, and x indicates a punctured state, and the communication interface is configured to not transmit the PPDU on the channel corresponding to a punctured state.

22. The non-transitory computer-readable storage medium according to claim 17, wherein the PPDU is in OFDMA transmission mode, and the bandwidth indication field indicates that the bandwidth of the PPDU is 80 MHz or 160 MHz or 320 MHz, which corresponds to one or more 80 MHz bandwidth frequency domain segments, the preamble puncturing information field indicating a puncturing status of a corresponding 80 MHz bandwidth frequency domain segment of the one or more 80 MHz bandwidth frequency domain segments, and wherein the puncturing status of the corresponding 80 MHz bandwidth frequency domain segment includes one of the following puncturing status: [1 1 1 1], [x 1 1 1], [1 x 1 1], [1 1 x 1], [1 1 1 x], [x x 1 1], and [1 1 x x], wherein 1 indicates a non-punctured state, and x indicates a punctured state, each value corresponds to a respective 20 MHz bandwidth in the corresponding 80 MHz frequency domain segment and when the program instructions are executed by the computer, the computer is further configured to not transmit the PPDU on a 20 MHz bandwidth corresponding to a punctured state.

23. The non-transitory computer-readable storage medium according to claim 17, wherein the PPDU is in non-OFDMA transmission mode, and the bandwidth field indicates that the entire bandwidth corresponding to the PPDU is a 320 MHz bandwidth, the preamble puncturing information field indicates that no puncturing is performed or that one 80 MHz or 120 MHz bandwidth of the 320 MHz bandwidth is punctured.

* * * * *